United States Patent [19]

Evelyn et al.

[11] 4,150,802

[45] Apr. 24, 1979

[54] AIRCRAFT ENGINE INSTALLATION

[75] Inventors: George B. Evelyn, Bellevue; Varnell L. James, Kent, both of Wash.

[73] Assignee: The Boeing Company, Seattle, Wash.

[21] Appl. No.: 801,546

[22] Filed: May 31, 1977

[51] Int. Cl.² ............................................. B64D 29/00
[52] U.S. Cl. ...................................... 244/54; 248/554
[58] Field of Search ................... 244/54, 53 R; 248/5; 60/226 R; 49/255; 415/201, 126; 220/245, 327, 329, 331, 334; 16/179; 292/256–267, 18

[56] References Cited

U.S. PATENT DOCUMENTS

| | | | |
|---|---|---|---|
| 2,863,620 | 12/1958 | Vautier | 248/5 X |
| 3,442,479 | 5/1969 | Barnett et al. | 248/5 X |
| 3,750,983 | 8/1973 | Morris | 244/54 |
| 4,037,809 | 7/1977 | Legrand | 244/54 |

FOREIGN PATENT DOCUMENTS 1002981  3/1952  France .................................... 244/54

Primary Examiner—Barry L. Kelmachter
Attorney, Agent, or Firm—Christensen, O'Connor, Johnson & Kindness

[57] ABSTRACT

An aircraft engine installation is disclosed wherein a gas turbine engine is supported within the interior of a tubular cowling that is affixed to the aircraft and all other components of the engine installation such as an air inlet and exhaust system structurally depend from the cowling rather than being mounted to the gas turbine engine. To permit access to the engine for inspection, repair or removal. the lower portion of the cowling is linked to a stationary upper portion of the cowling by a set of jackscrew assemblies spaced apart along each axial boundary of the upper and lower cowling units. The jackscrew assemblies are operable to lower the lower cowling unit to a position at which integral locks, included in one set of the jackscrews, can be released to permit the lower cowling unit to be swung open about integral hinges that are included in the second set of jackscrews. A powered actuator system, mounted within the upper cowling unit, is operable to swing the lower cowling unit about the hinges to open or close the cowling and can also be utilized to raise and lower the gas turbine engine between the upper cowling unit and ground level during an engine change operation. To securely fasten the upper and lower cowling units together whenever the cowling is closed, interlock assemblies are included along each of the mating boundaries of the two cowling units. In one disclosed arrangement, the interlock assemblies of each individual pair of boundaries are operated in unison by a geared drive system and both sets of jackscrews are operated in unison by a second geared drive system. In an alternative arrangement, a drive system is included which can be selectively operatied to activate either the interlock assemblies or both sets of jackscrews. To provide a visual indication that the lower cowling unit is not securely latched to the upper cowling unit, warning flags are arranged to project from the exterior surface of the cowling unless the interlocks are in a fully closed condition.

33 Claims, 23 Drawing Figures

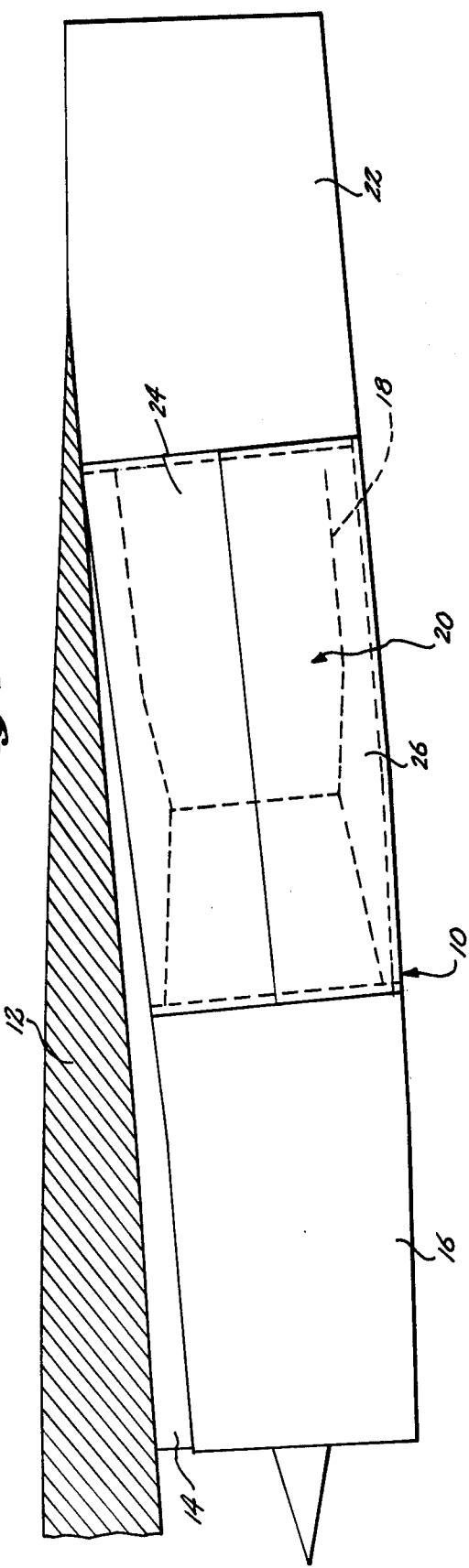
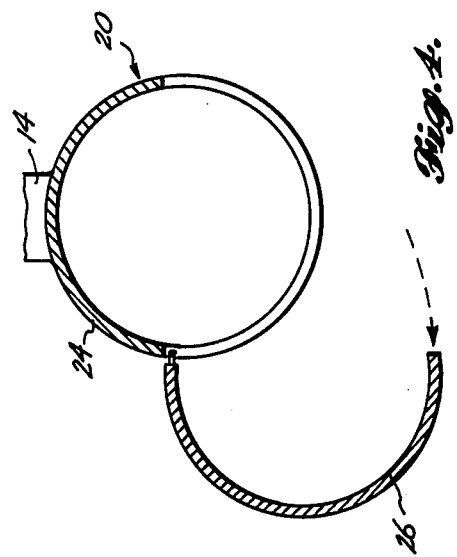
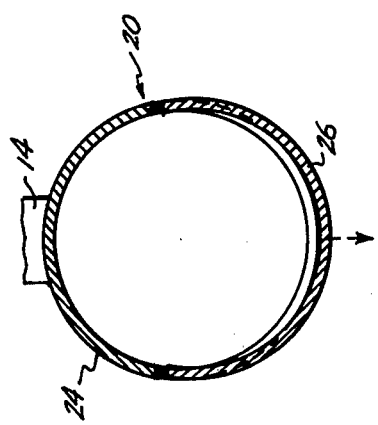
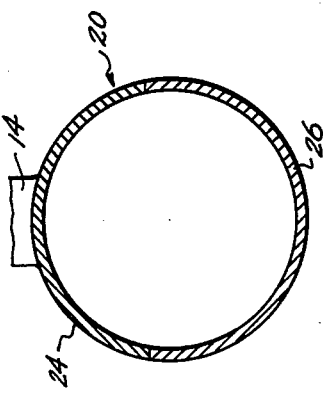

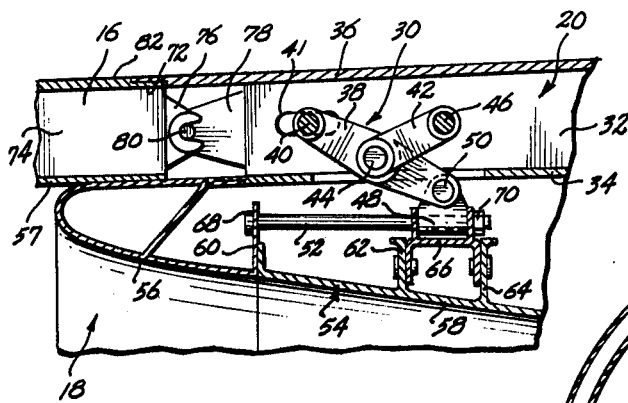

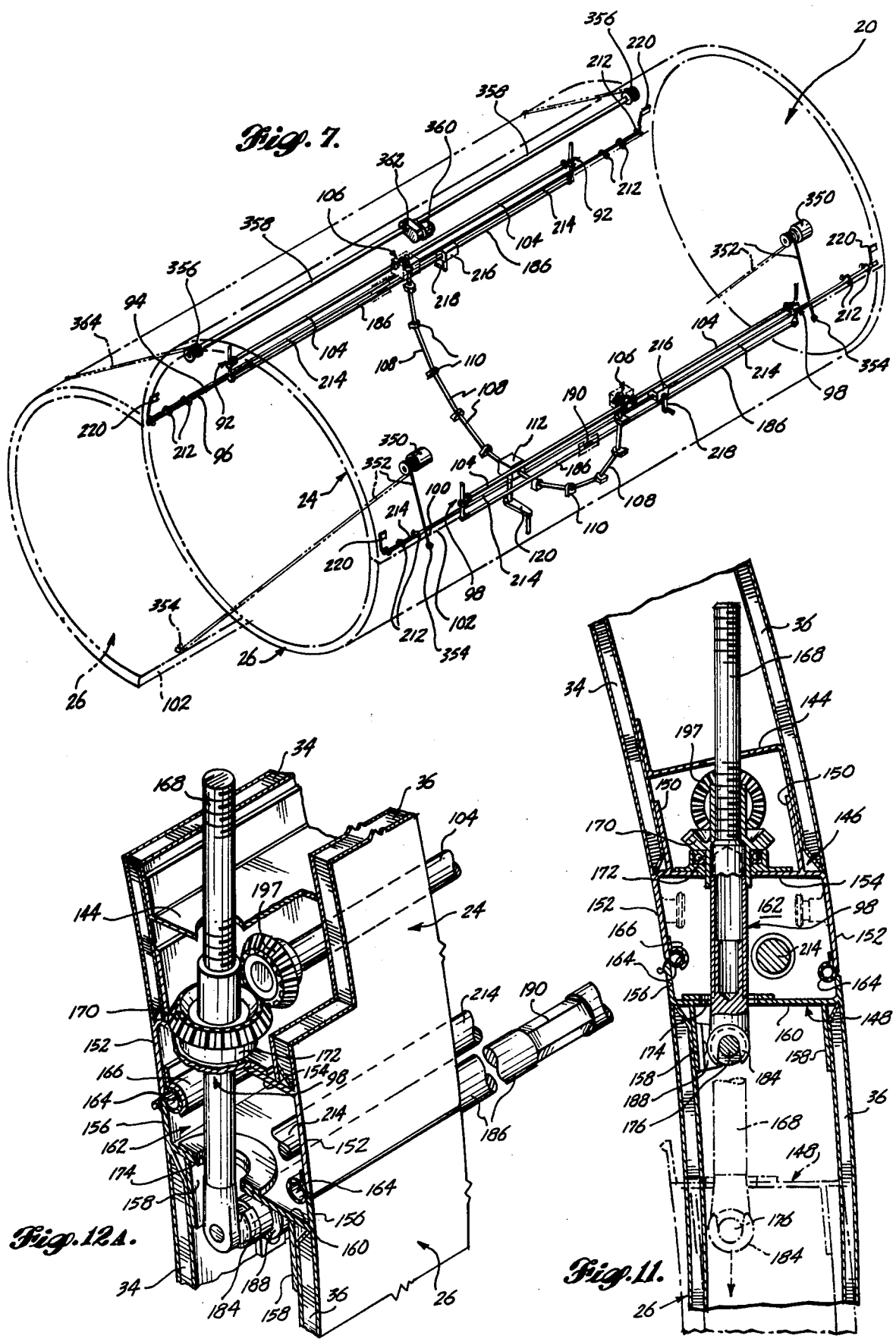

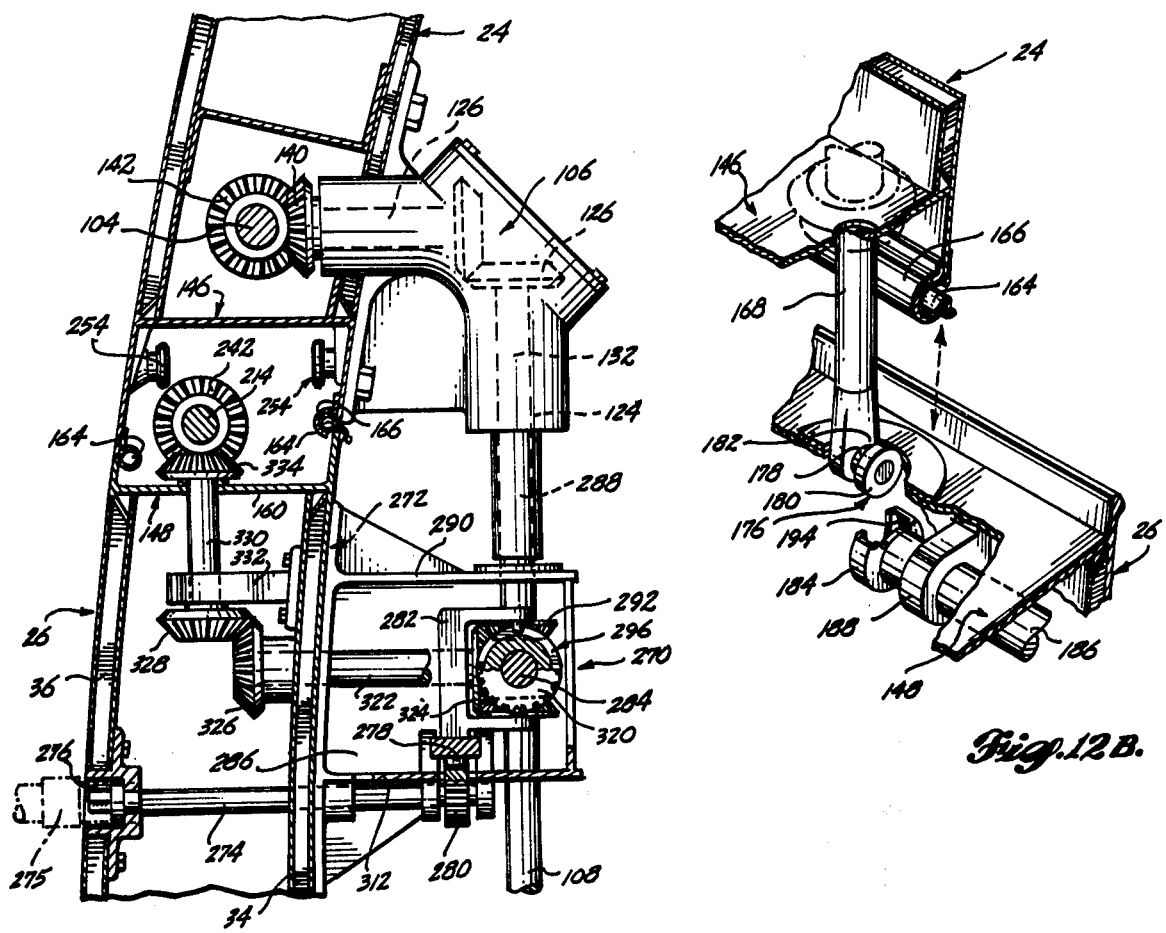
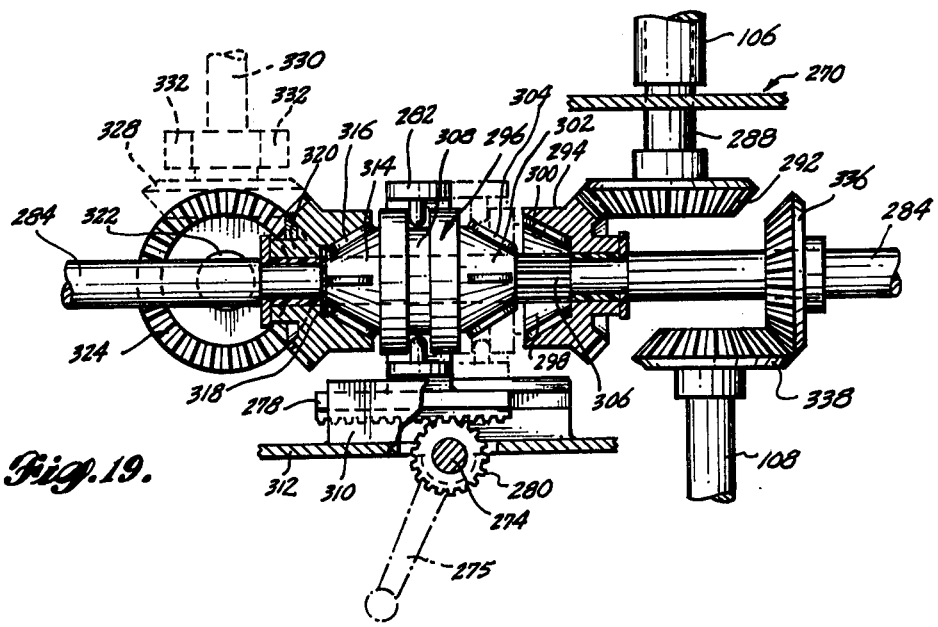

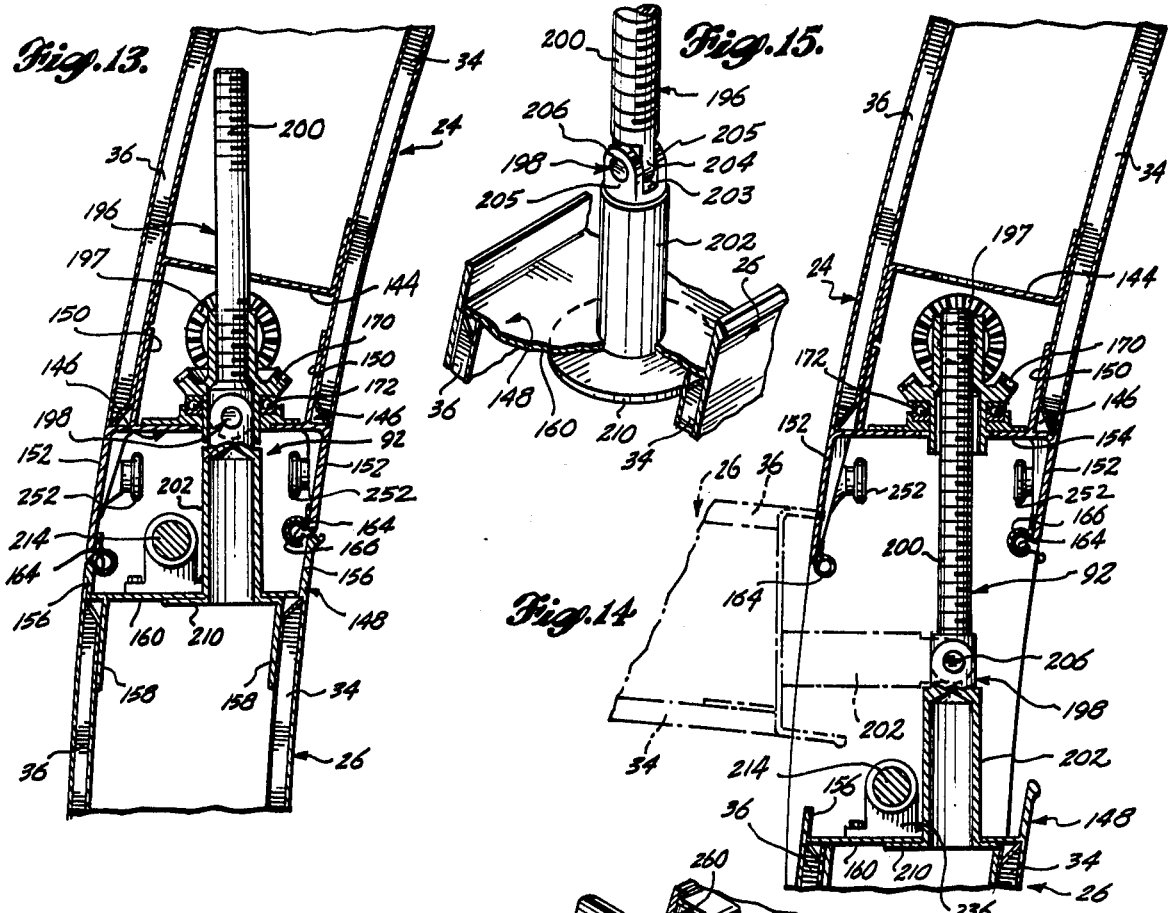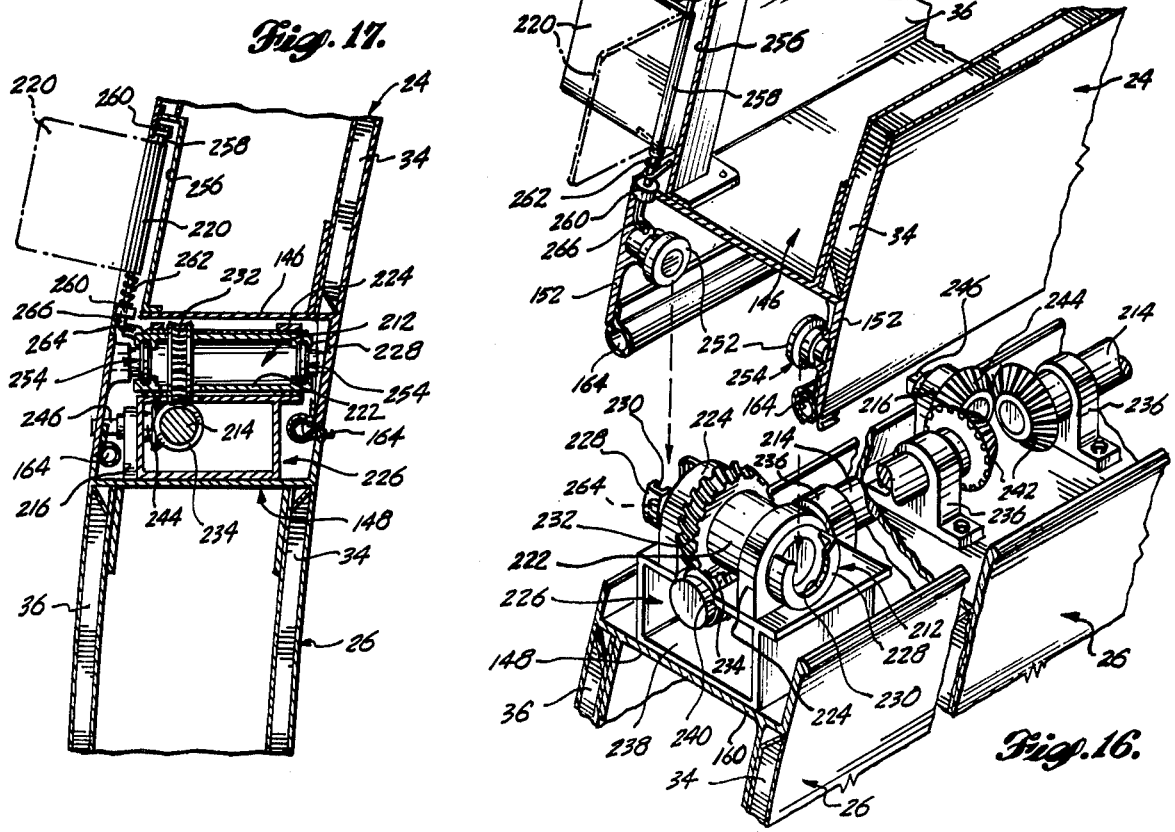

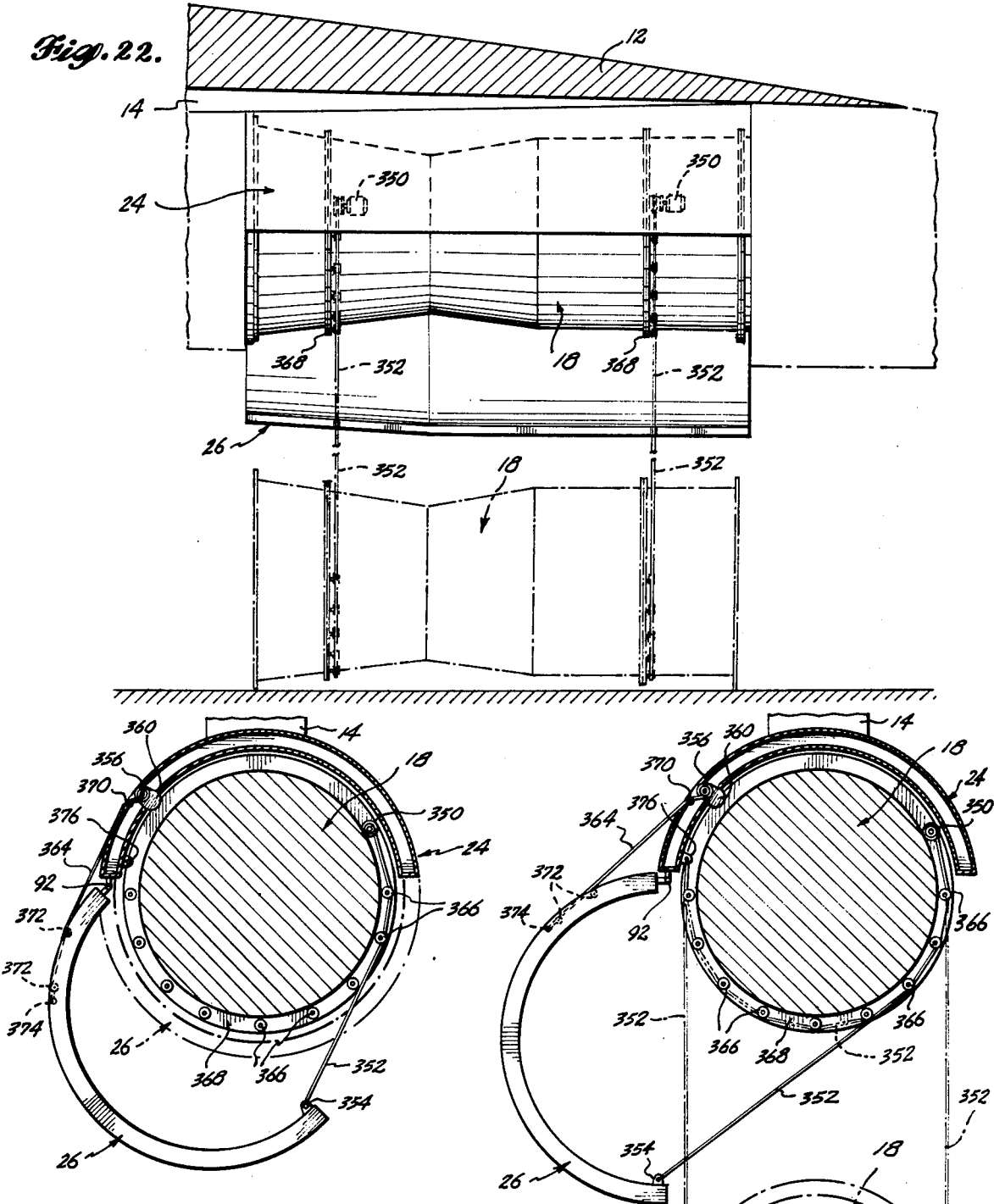

AIRCRAFT ENGINE INSTALLATION

BACKGROUND OF THE INVENTION

This invention relates to engine installations for gas turbine powered aircraft. More particularly this invention relates to an engine mounting arrangement wherein the weight and outer diameter of the engine installation is minimized by configuring the engine cowling to bear structural loading and mounting components of the propulsion system to the cowling rather than to the gas turbine engine.

In prior art engine installations wherein a propulsion system including a gas turbine engine is mounted beneath the wing of an aircraft (or depends from other aircraft structure), the engine is generally mounted to the aircraft by means of a pylon or other structural member. The remaining propulsion units of the engine installation are then structurally connected to the engine. For example, in such an engine installation, an air inlet duct is generally bolted to the forward face of the gas turbine engine and an exhaust system, including apparatus such as an exhaust nozzle and thrust reversers, is bolted to the rear face of the engine. A sheet metal cowling assembly is then installed to enclose or cover the propulsion system and form an aerodynamically smooth surface.

Since an engine installation configured in this manner includes components such as the air inlet, exhaust nozzle and thrust reversers which are connected directly to the engine and extend axially therefrom, static and dynamic load forces are exerted on the engine. For example, because these components generally have substantial axial length and substantial mass, they are subjected to inertial forces which cause substantial bending moments to be exerted on the gas turbine engine. Further, during aircraft flight, pressure differences established by airflow around and through the air inlet and the exhaust system cause additional bending moments to be exerted on the gas turbine engine.

To prevent such bending moments from being exerted on internal engine structure such as the shafts which link the engine compressor and turbine stages, the load in prior art engine arrangements must generally be borne by the engine casing or shell that surrounds the internal engine structure. Thus, in the past, the engine casing and/or internal engine structure has necessarily been constructed to withstand substantial structural loading. Configuring an engine to meet these load requirements has meant that the engine casing and various other engine components have been necessarily constructed of relatively heavy material, with the various components having a greater cross-sectional geometry than would be necessary if the engine were not subjected to structural loading by other components of the propulsion system.

In view of the above, it can be recognized that the arrangement of the prior art engine installation results in two major problems and drawbacks, each of which can substantially affect aircraft performance and efficiency. First, a substantial weight penalty can be incurred, since a gas turbine engine constructed to withstand the aforementioned structural loading is heavier than required from the standpoint of engine performance. Secondly, as described above, gas turbine engines configured to withstand structural loading induced by other components of the engine installation are larger in diameter than if the engine were configured solely on the basis of propulsion requirements. Due to this larger engine diameter, the outer diameter of the engine installation is greater than would otherwise be necessary. Thus, even though the engine cowling is aerodynamically contoured, significant drag can be encountered because of the relatively large cross-sectional geometry and the relatively large surface area of the engine cowling.

It will be recognized that the aforementioned considerations, although pertaining to all engine installations of the type described, become especially important in supersonic aircraft. In particular, due to relatively complex air supply requirements and exhaust flow requirements, the air inlets, exhaust nozzles and thrust reversers of supersonic engine installations are relatively long and heavy and hence exert strong bending moments on the engines of the prior art arrangement. Further, at transonic and supersonic speeds, drag considerations and flow separation along the aerodynamically contoured surface of the engine installation become especially important.

In addition to weight and drag considerations, it is both desirable and necessary to configure an engine installation such that the gas turbine engine is accessible for maintenance and engine removal procedures. In this respect, the engine cowlings of prior art engine installations often consist of removable sheet metal panels arranged such that all or part of the cowling can be removed for engine replacement operations or for access to particular engine and propulsion unit components. In other engine mounting arrangements wherein the gas turbine engine is effectively enclosed by aircraft structure, i.e., mounted within the aircraft tail assembly or within the wings, either a cowling or a portion of the aircraft structure is configured for removal or folding movement relative to remaining portions of the engine mounting arrangement to thereby expose the engine. In many of these arrangements, weight penalties are incurred, undue time is required for engine removal, and inspection, repair and maintenance are difficult with the gas turbine engine in place.

With respect to engine removal and installation, further problems are encountered with many of the prior art engine installations. Specifically, in many aircraft configurations, the engines are located a considerable height above the level of the ground and specially designed ground-support equipment is required for removing the engine and/or positioning the engine during engine installation procedures. Although such ground support equipment may perform satisfactorily, it is often complex and costly. Further, such specialized equipment may not available at each location where it is necessary to remove an aircraft engine.

Accordingly, it is an object of this invention to provide a lightweight engine installation wherein minimal structural loading is borne by the gas turbine engine.

It is another object of this invention to provide an aircraft engine installation of minimal cross-sectional geometry to thereby reduce drag forces exerted on the engine installation during aircraft flight.

It is yet another object of this invention to provide an engine-cowling arrangement for use in an engine installation of a gas turbine powered aircraft wherein loading caused by components of the engine installation such as air inlets and exhaust nozzles are not coupled to the gas turbine engine, but are efficiently borne by a cowling structure which surrounds the gas turbine engine.

It is still another object of this invention to provide an engine mounting arrangement of the above-described type wherein the engine cowling is arranged to provide ready access to the gas turbine engine for purposes of inspection, repair and removal.

Even further it is an object of this invention to provide an engine mounting arrangement of the above-described type including means for raising and lowering the gas turbine engine between the cowling and ground level during engine removal and installation procedures.

SUMMARY OF THE INVENTION

These and other objects are accomplished in accordance with this invention by an engine-cowling arrangement wherein the cowling is rigidly affixed to aircraft structure such as a wing and is configured for the mounting of other propulsion unit components such as the engine air inlet and engine exhaust system. Since such components of the engine installation do not depend from the gas turbine engine, but are attached to the cowling, the gas turbine engine is not subjected to the previously described loading forces. Hence, the engine can be lighter in weight than gas turbine engines designed to support the additional propulsion unit components and can be configured with a smaller cross-sectional diameter. Since a cowling-engine arrangement configured in accordance with this invention carries structural loading in a more efficient manner than an arrangement wherein the various components of the engine installation depend from the fore and aft faces of the gas turbine engine, the combined weight of a cowling-engine of this invention is less than the weight of conventional cowling-engine arrangements. Further, since the cross-sectional geometry of the engine installation is minimized, a substantial decrease in drag is achieved relative to engine installations of conventional design.

In the preferred embodiment of the invention, the cowling is a substantially tubular assembly having two spaced-apart, substantially cylindrical walls which are coaxially joined together. The gas turbine engine is supported within the central opening of the cowling with the axial centerline of the engine generally being substantially coextensive with the axial centerline of the cowling. In the disclosed embodiment, the forward end of the gas turbine engine is supported by a number of mounting arms which are spaced-apart around the circumference of the engine and interconnect the cowling with the gas turbine engine. These mounting arms are configured and arranged to allow at least limited movement of the engine relative to the cowling, such movement being caused, for example, by temperature gradients within the interior of the cowling and/or differing thermal coefficients of expansion among the components of the cowling and the gas turbine engine. The aft end of the gas turbine engine of the depicted embodiment is effectively suspended within the cowling to allow such temperature induced movement by a series of rod-like members connected in tension between the engine casing and the cowling.

To provide ready and adequate access to the gas turbine engine, the cowling of this invention includes two cowling sections, of sectorial cross-sectional shape, which can be joined together along adjoining axial boundary edges to form the overall cowling arrangement. One of the cowling sections (an upper cowling unit in the disclosed embodiment), is rigidly affixed to the aircraft sturcture and each axially extending boundary edge of the upper cowling unit is linked to an associated axial boundary edge of the lower cowling unit by a set of jackscrews. In this arrangement, the jackscrews of each set are spaced apart from one another along one of the mutually opposed sides of the cowling and permit the lower cowling unit to be moved away from and swung about on edge of the upper cowling unit to provide access to the gas turbine engine. In the preferred embodiment, both sets of jackscrews are operable by a single drive mechanism to position the associated axial boundaries of the upper and lower cowling units in substantially contacting juxtaposition with one another and to position the associated axial boundaries in a substantially parallel, spaced-apart relationship with one another during the cowling opening and closing sequence. The drive mechanism for simultaneously activating both sets of jackscrews includes two torque tubes, mounted in the interior region of the upper cowling unit to extend substantially parallel to the two axially extending boundary edges. Each of the torque tubes extends between the jackscrew assemblies that are located along one of the axial boundaries of the upper cowling unit and is geared to turn the jackscrew assemblies as the torque tube is rotated. To simultaneously rotate the two torque tubes, each torque tube is geared to a system of universally joined shafts that extend circumferentially along the interior wall of the lower cowling section to a single crank arm position. The crank arm is geared to the universally joined shafts to simultaneously turn the torque tubes which, in turn, rotate the jack screw assemblies to lower the lower cowling unit to a position in which the lower cowling can be swung open and to raise the lower cowling unit to a position in which the axial boundaries of the upper and lower cowling units can be latched together to form the tubular cowling assembly.

To permit the lower cowling to be swung open, the set of jackscrews positioned along one pair of the axial boundaries of the upper and lower cowling units include integral hinges, and the set of jackscrews mounted along the other pair of mating axial boundaries include integral locking devices operable to structurally disconnect that axial boundary of the lower cowling unit from the associated axial boundary of the upper cowling unit. In this arrangement, when the jackscrews are operated to spatially separate the lower cowling unit from the upper cowling unit, the set of jackscrews including the locking devices are activated to uncouple one edge of the upper cowling unit from the associated edge of the lower cowling unit and the lower cowling unit can then be swung about the hinges of the other set of jackscrews to completely expose the gas turbine engine. In the preferred embodiment, the jackscrew locking devices are operated in unison by a torque tube axially extending between the jackscrews.

In the preferred embodiments of the invention, a first pair of spaced-apart cable drums, mounted within the upper cowling unit at a position above the set of jackscrews that include the integral locking devices, controls the swinging movement of the lower cowling unit between the closed position and a free-hanging position. Each cable drum is power-actuated and includes a cable that is attached at or near the axial boundary of the lower cowling unit that is uncoupled from the upper cowling unit. During the cowling opening sequence, the cable drums are actuated to control the rate at which the lower cowling unit swings open under the force of gravity. During the cowling closure sequence the cable drums are actuated to swing the lower cowling unit into a position at which the jackscrew locking devices can be engaged such that both axial boundaries of the lower cowling unit are both coupled to the associated axial boundaries of the upper cowling unit.

To swing the lower cowling unit beyond the free-hanging position, a second pair of spaced-apart cable drums is mounted within the upper cowling unit above the set of jackscrew assemblies that include the integral hinges. In the preferred arrangement these cable drums are mounted to and extend concentrically from each end of a torque tube that is driven by a single actuator. Each cable drum includes a cable that is circumferentially routed along the exterior of the upper and lower cowling units with the cables being connected to the lower cowling unit at positions below the hinge axis formed by the hinge-equipped jackscrews. During the cowling opening sequence, the cable drums are actuated to swing the lower cowling unit open beyond the free-hanging position. During the cowling closure sequence, the cable drums are actuated to control the rate at which the lower cowling unit swings downwardly to the free-hanging position.

In embodiments of the invention in which the engine installation is a considerable height above the ground, the first pair of cable drums are arranged to facilitate engine removal and installation. More specifically, when an engine is to be removed or installed, the cowling is placed in the fully open position by operation of the first and second pairs of cable drums. The cables of the first pair of cable drums are then disconnected from the lower cowling unit and connected to the axial boundary of the upper cowling unit to form two downwardly extending loops which encompass the lower periphery of the engine. By operating the cable drums an engine can be raised and lowered between its mounting position and a conventionally configured trailer or dolly located on the ground.

To securely interconnect the upper and lower cowling units with one another when the cowling is closed, the lower cowling unit includes a number of interlock mechanisms spaced-apart from one another along each of axially extending boundaries of the lower cowling unit. The interlock mechanism of each axial boundary are preferably gear-driven by a torque tube extending along the associated axial boundary of the lower cowling unit. When the upper and lower cowling units are positioned adjacent one another, each interlock mechanism is rotated by the associated torque tube to engage the interlock mechanism with a locking post mounted at a corresponding position along the mating axial boundary of the upper cowling unit. As the interlock mechanisms are activated, the upper and lower cowling units are drawn tightly together and securely latched to one another. When the lower cowling unit is to be opened to expose the gas turbine engine, the interlock mechanisms are rotated to release the upper cowling unit and lower cowling unit from one another and the lower cowling unit is then lowered and swung open with the jackscrew assemblies and cable drums as described above. Alarm flags, activated by the arrangement of the interlock mechanisms, project outwardly from the outer wall of the cowling whenever the lower cowling unit is not securely latched to the upper cowling unit.

In one disclosed embodiment, the torque tubes that activate the interlock mechanisms are individually operated by means of a hand crank or powered cranking tool that is inserted in an opening in each side of the cowling unit. The crank engages with a gear system to rotate one of the torque tubes and thus operate the interlock mechanisms along one side of the cowling. In a second disclosed embodiment, the jackscrew drive system includes a transfer gear arrangement to selectively operate the jackscrews or drive both of the torque tubes that operate the interlock mechanisms.

BRIEF DESCRIPTION OF THE DRAWINGS

Other objects and advantages of the present invention will become apparent to one skilled in the art after a reading of the following description taken together with the accompanying drawings, in which:

FIG. 1 is a simplified side elevation view of an aircraft engine installation configured in accordance with this invention;

FIGS. 2, 3 and 4 are transverse cross-sectional views taken along the line 2—2 of FIG. 1 and depicting the basic operation of the invention to provide access to the gas turbine engine;

FIGS. 5 and 6 depict one arrangement for mounting a gas turbine engine within the cowling of this invention, with FIG. 5 depicting a mounting arrangement for the forward end of the gas turbine engine and FIG. 6 illustrating a mounting arrangement for the aft end of the engine;

FIG. 7 is a simplified isometric view of a cowling configured in accordance with this invention which schematically illustrates a jackscrew arrangement that is utilized to move the lower cowling unit downwardly and away from the upper cowling unit and additionally form hinges and locks that permit the lower cowling unit to be swung open for access to the gas turbine engine, and arrangement of interlock mechanisms for latching the lower cowling unit and upper cowling unit together, drive systems for operating the jackscrews, the jackscrew locks, and the interlock mechanisms, and an actuator system for swinging the lower cowling unit open and closed or raising and lowering a gas turbine engine during engine installation and removal;

FIG. 8 is a transverse, cross-sectional view of a cowling in accordance with this invention which further illustrates the drive system used to operate the jackscrew arrangement of FIG. 7;

FIG. 11 is a transverse cross-sectional view depicting the arrangement of those jackscrews which include locks for releasing the lower cowling unit from the upper cowling unit;

FIGS. 12a and 12b are isometric views of the integrated jackscrew-lock arrangement of FIG. 11 which further depict that portion of the jackscrew drive system that operates the jackscrews and also depict the drive mechanism for operating the integral locks thereof;

FIG. 13 is a transverse cross-sectional view of a portion of a cowling configured in accordance with this invention which depicts the jackscrews that include integral hinges with the lower cowling unit being illustrated in the closed position;

FIG. 14 is a cross-sectional view of the integrated jackscrew-hinge system depicted in FIG. 13 illustrating the jackscrew arrangement when the lower cowling unit is in the lowered position and when the lower cowling unit is swung open to provide access to the gas turbine engine;

FIG. 15 is an isometric view of the integral hinge arrangement of the jackscrews of FIG. 14;

FIG. 16 is an isometric view of interlock mechanisms and a drive system therefor which securely latch the upper and lower cowling units to one another when the lower cowling unit is closed;

FIG. 17 is a transverse cross-sectional view further illustrating the arrangement of the interlock mechanisms depicted in FIG. 16;

FIGS. 18 and 19 are cross-sectional views taken along substantially orthogonal planes that depict an alternative drive system arranged for selectively driving either the jackscrews of FIGS. 11 through 14 or the interlock mechanisms of FIGS. 16 and 17;

FIGS. 20 and 21 are cross-sectional views which further depict the actuator system of FIG. 7 with FIG. 20 illustrating operation of the actuator system to move the lowering cowling unit between the closed and a free-hanging position and FIG. 21 illustrating operation of the actuator system to move the lower cowling unit between the free-hanging and fully open position; and FIG. 22 is a side elevation view depicting operation of the actuator system of FIGS. 20 and 21 to raise and lower a gas turbine engine between the structural cowling and ground level.

DETAILED DESCRIPTION

Figure 9:
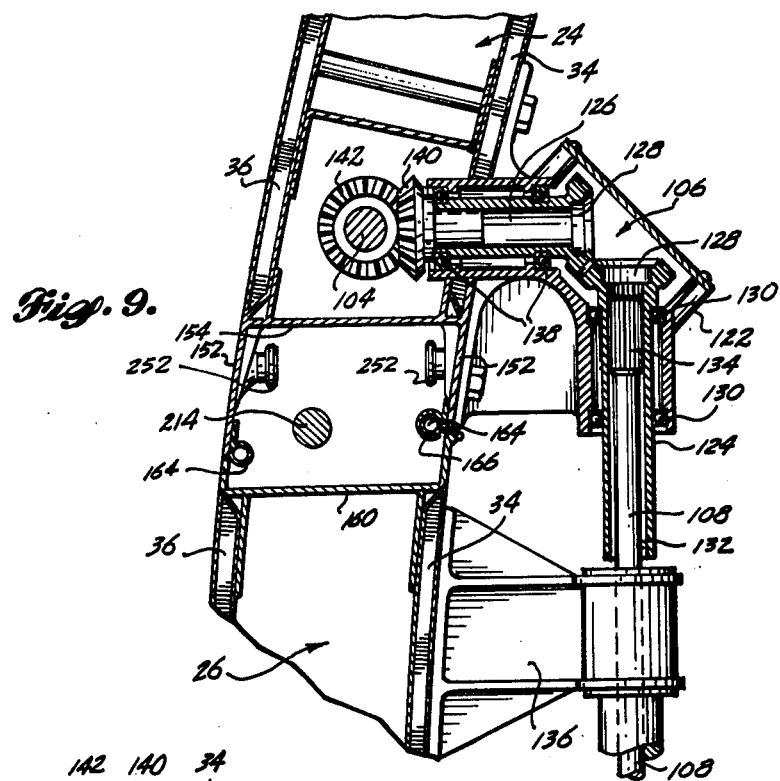
FIG. 9 is a more detailed cross-sectional view of a portion of the jackscrew drive system of FIG. 8 which illustrates the arrangement of the drive system when the lower cowling unit is in the closed position.

FIG. 1 schematically depicts an aircraft engine installation (generally denoted by the numeral 10) configured in accordance with this invention. Although the engine installation 10 is illustrated in FIG. 1 as being mounted beneath an aircraft wing 12, and the embodiment disclosed herein is discussed within such a reference system, it will be recognized upon understanding the invention that other mounting arrangements can be utilized. For example, the engine installation 10 can be securely affixed at other positions of the aircraft such as alongside the fuselage or mounted to portions of the aircraft tail assembly. Further, the engine installation 10 can be directly connected to appropriate surfaces of the aircraft or can depend therefrom on various structural members.

In FIG. 1, the engine installation 10 is supported chordwise to the lower surface of the wing 12 by a beam 14 that extends axially along the upper region of the engine installation. In the axial direction, the beam 14 is tapered to support the engine installation 10 at the desired angle relative to the lower surface of the wing 12. In the depicted arrangement the engine installation 10 comprises an air inlet 16, a gas turbine engine 18 supported within a cowling 20, and an exhaust system 22. In the conventional manner, the air inlet 16, gas turbine engine 18 and exhaust system 22 are serially arranged with the engine 18 being the centrally positioned unit.

As is known in the art, the air inlet 16 is structured to supply air to the gas turbine engine 18 through an inlet duct of fixed or variable geometry. Additionally, the air inlet 16 can include various noise suppression apparatus such as sound absorbent liners. Further, and especially in the engine installation of a supersonic aircraft, the air inlet 16 can include various door arrangements for controlling the airflow through the air inlet during the different flight modes. These door arrangements can be either integrally formed in the air inlet 16 or included within a separate section connected to the aft end of the air inlet 16. In any case, a variety of air inlet configurations are satisfactory for use with the present invention. As shall be described hereinafter, air inlets 16 of the engine installation 10 need differ from conventional arrangements only in that an air inlet 16, structured in accordance with this invention, is arranged for interconnection with the front face of the cowling 20, rather than being configured for structural support by the gas turbine engine 18.

As indicated previously and as shall be fully understood upon reading the following paragraphs, the cowling 20, which encases and supports the gas turbine engine 18, differs from conventional engine cowlings in that the cowling 20 is not simply an aerodynamically contoured cover assembly for enclosing all or a portion of the engine installation, but is a structural member which supports both the gas turbine engine 18 and the other components of the aircraft propulsion system such as the air inlet 16 and the exhaust system 22. Because of these differences between the cowling 20 of this invention and conventional cowling arrangements, the engine cowling 20 is generally referred to herein as a "structural" cowling.

As can be seen in FIGS. 1 and 2, the structural cowling 20 is effectively a double-walled duct having an axial length at least coextensive with the length dimension of the gas turbine engine 18. Although a structural cowling 20, structured in accordance with this invention, can exhibit geometry other than the substantially cylindrical geometry depicted (e.g., ellipsoidal or rectangular), such cylindrical geometry is advantageous from the standpoint of pressure containment and from the standpoint of induced drag. In any case, to provide ready access to the gas turbine engine 18, the structural cowling 20 includes two axially extending duct segments arranged for attachment to one another to effectively form a unitary cowling structure. More explicitly, in the depicted embodiment, the structural cowling 20 is formed by an upper cowling unit 24 and a lower cowling unit 26 each having a sectorial cross-sectional shape. In particular, in the depicted embodiment the upper cowling unit 24 constitutes slightly less than one-half of the circular cross-sectional geometry of the structural cowling 20 and is joined to the beam 14 to project symmetrically downward therefrom. The lower cowling unit 26 forms the remaining portion of the structural cowling 20 with the adjoining axial boundaries of the upper and lower cowling units 24 and 26 being linked together and fastenable to one another.

As is illustrated in FIGS. 3 and 4, and as shall be described in more detail hereinafter, the lower cowling unit 26 can be separated from the upper cowling unit 24 and swung about a hinge axis that is substantially parallel to one axial boundary of the upper cowling unit 24 to expose the gas turbine engine 18 for inspection, maintenance or removal procedures. More explicitly, FIG. 3 depicts one step in an opening sequence of a cowling of this invention in which the lower cowling unit 26 is moved downwardly and away from the upper cowling unit 24. As can be seen in FIG. 4, when the lower cowling unit 26 has been moved to a position wherein the axial boundaries of the upper and lower cowling units 24 and 26 will not interfere with one another, one axial boundary of the lower cowling unit 26 can be disconnected from the associated axial boundary of the upper cowling unit 24 and the lower cowling unit 26 can be swung about a hinge line that is substantially coincident with the axial boundary of the lower cowling unit 26 that is still joined to the upper cowling unit 24 to open the cowling 20 and expose the gas turbine engine 18.

The gas turbine engine 18 can be any one of the various types of gas turbine engines configured for supplying a thrust-producing exhaust stream for propelling the aircraft, e.g., the engine 18 can be of the turbojet, turbofan, or multicycle engine varieties. As shall be discussed in more detail hereinafter, in accordance with this invention the gas turbine engine 18 is not directly connected to the wing 12 or to other structure from which the engine installation 10 may depend, but is supported only by the structural cowling 20. It will be recognized upon understanding the arrangement of this invention described hereinafter that, in the practice of this invention, the gas turbine engine 18 can be considerably lighter in weight than most conventional gas turbine engines configured for the same propulsion performance. In particular, in the arrangement of this invention neither the air inlet 16 or the engine exhaust system 22 structurally depend from the engine 18. Accordingly, the gas turbine engine 18 need not be constructed to withstand structural loading normally exerted on the gas turbine engine of a conventional engine arrangement by axially extending units of the propulsion system such as air inlets and exhaust systems.

The exhaust system 22 of FIG. 1 extends axially from the rear face of the structural cowling 20 and is mounted to the cowling 20 in a manner similar to the mounting of the air inlet 16. As is known in the art, such an exhaust system is configured to direct the engine exhaust gasses rearwardly and form a thrust producing fluid stream for propelling the aircraft. Such exhaust systems generally include an exhaust nozzle of fixed or variable geometry for controlling the gaseous fluid flow passing through the exhaust system and often include a thrust reverser stage for effectively braking the aircraft. Additionally, such exhaust systems can include additional apparatus such as a mixer stage for mixing the engine combustion products with ambient air or air supplied by a fan stage of the gas turbine engine 18. Regardless of the exact configuration of the engine exhaust system 22, it should be recognized that the exhaust system 22 is configured such that neither substantial static loading, due to the mass of the exhaust system 22, nor substantial dynamic loading such as that caused by air pressure exerted on the exhaust system during aircraft flight, is coupled to the gas turbine engine 18. Rather, such structural loading is coupled to and borne by the structural cowling 20.

FIGS. 5 and 6 depict one arrangement for mounting the gas turbine engine 18 within a structural cowling 20 of this invention and further depict a mounting arrangement for interconnecting propulsion components such as the air inlet 16 and the engine exhaust system 22 with the structural cowling 20. Referring first to FIG. 5, the forward end of the gas turbine engine 18 is connected with the structural cowling 20 by a plurality of arm assemblies 30 which are spaced-apart from one another along the circumference of the cowling 20. Each arm assembly 30 is mounted to an axially extending beam or longeron 32 which is one of a number of such axially extending longerons that extend radially between the cowling inner wall 34 and the cowling outer wall 36 to interconnect the inner and outer walls and strengthen the structural cowling 20. More explicitly, each arm assembly 30 includes an elongate pivot arm 38 connected to the longeron 32 by a pin 40 which passes through an opening in one end of the pivot arm 38 and an axially extending slot 41 in the longeron 32. One end of a second arm 42 is pivotably connected to the center of the pivot arm 38 by a pin 44, with the other end of the arm 42 being pivotably attached to the longeron 32 by a pin 46. Since the arm 42 is shorter than the pivot arm 38 and is attached to the longeron 32 at a position aft of the attachment of pivot arm 38, each pivot arm 38 extends at an acute angle relative to the cowling walls 34 and 36 to project rearwardly and inwardly toward the gas turbine engine 18. The second end of the pivot arm 38 is pivotably connected to an engine mounting bracket 48 by a pin 50. Each engine mounting bracket 48 is substantially tubular in geometry with the pin 50 passing through a flange that extends axially along the mounting bracket 48 and substantially coincident with the plane of cross-sectional symmetry. Thus, the central opening in each tubular mounting bracket 48 extends generally in the fore and aft directions. A removable mounting pin 52, passing through the central opening of the mounting bracket 48 and an engine mounting bracket 54 of the gas turbine engine 18, securely interconnects the gas turbine engine 18 with the arm assembly 30.

In the arrangement of FIG. 5, the mounting bracket 54 of the gas turbine engine 18 is located aft of an annular section 56, which forms the forward end of the engine 18. The annular section 56 is configured and arranged such that the outer boundary surface thereof substantially contacts the inner wall 57 of the air inlet 16 to thereby direct inlet air flowing through the air inlet 16 into the gas turbine engine 18. Generally, all or a portion of the annular section 56 is removable for access to the mounting pins 52 when an engine is installed in or removed from the structural cowling 20.

Each mounting bracket 54 is formed on an engine wall 58 which extends rearwardly from the annular section 56 to form a portion of the casing or shell that surrounds the engine components. More explicitly, the depicted mounting bracket 54 includes three axially spaced-apart flanges 60, 62 and 64 that extend radially outward from the engine wall 58 toward the inner wall 34 of the structural cowl 20. The two lower, substantially parallel legs of a somewhat H-shaped bracket 66 are affixed to the rearmost flanges 62 and 64. The two upper, substantially parallel legs of the bracket 66 are spaced-apart for receiving the engine mounting bracket 48 of the arm assembly 30 and include axially aligned openings for the insertion of the mounting pin 52. As shown in FIG. 5, the mounting pin 52 passes rearwardly through an opening in the outer region of the flange 60 and the opening in the first upper leg of the bracket 66, through the central opening of the engine mounting bracket 48, and then through the aligned opening in the second leg of the mounting bracket 66. To retain each mounting pin 52 within the mounting bracket 54, the forward end of the mounting pin 48 includes a radially extending head region 68, of hexagonal or other conventional shape, and a portion of the aft end of the mounting pin 48 is threaded for receiving a conventional nut 70.

The engine mounting arrangement of FIG. 5 is advantageous in engine installations wherein the engine casing, e.g., the engine wall 58, exhibits a different coefficient of terminal expansion than the structural cowling 20. Specifically, as the gas turbine engine 18 experiences thermally-induced contraction or expansion, the pin 40 slides fore and aft in the slot 41 to allow limited movement of the engine 18 within the structural cowling 20. It should be recognized, however, that various other engine mounting arrangements can be utilized on the practice of the invention. For example, in situations in which provision for such limited movement of the engine is not necessary, the gas turbine engine 18 can be directly connected to the structural cowling 20 by circumferentially spaced-apart bolts that extend radially through the structural cowling 20 and engage with mounting brackets that are affixed to the engine casing.

FIG. 5 further illustrates a structural arrangement for interconnecting the structural cowling 20 with other components of the engine installation such as the air inlet 16 and the exhaust system 22. More particularly, FIG. 5 depicts the aft terminus of an air inlet 16 which is substantially tubular in geometry and includes two spaced-apart walls 57 and 72 that are interconnected by axially extending longerons 74. The longerons 74 are spaced-apart around the circumference of the air inlet 16 with at least several of the longerons 74 extending in axial alignment with the longerons 32 of the structural cowling 20. A mounting flange 76 extends axially rearward from selected ones of the air inlet longerons 74 and a mounting flange 78, configured for receiving the mounting flange 76, projects forwardly from the cowling longerons 32. For example, each cowling mounting flange 78 can be fork-shaped in geometry with the air inlet mounting flange 76 extending between the spaced-apart, forwardly extending legs of the mounting flange 78. A pin 80 is then driven, or otherwise retained, in aligned openings of the mounting flanges 76 and 78 to securely interconnect the air inlet 16 with the structural cowling 20. To maintain a relatively smooth outer surface along the contiguous boundaries of the air inlet 16 and the structural cowl 20, the outer wall 72 of the air inlet 16 and the outer wall 36 of the structural cowl 20 can be configured to effectively form a rabbet joint, or the outer walls 82 and 36 can be configured to form a recess or channel for receiving a cover strap (not shown in FIG. 5) which circumferentially encompasses the engine installation and provides access for removal of the air inlet 16 from the engine installation 10.

Referring now to FIG. 6, the aft end of the gas turbine engine 18 can be supported within the structural cowling 20 by a plurality of tension rods 84 that extend between circumferentially spaced-apart attachment points 86 on the engine 18 and circumferentially spaced-apart attachment points 88 located on the structural cowling 20. The attachment points 88 of the structural cowling 20, which are positioned rearwardly of the attachment points 86 of the gas turbine engine 18, can be configured in a variety of manners. For example, the attachment points 88 can be axially extending bosses or brackets formed in or mounted to a panel 90 which circumferentially spans the intervening region between adjacent longerons 32 of the structural cowling 20. In such an arrangement, a portion of the cowling inner wall 34 is cut away to permit the tension rods 84 to extend therethrough for connection with the attachment points 88. In any case, the circumferentially spaced-apart attachment points 86 of the gas turbine engine 18 are generally positioned equidistant from adjacent attachment points 88 of the structural cowling 20 and a tension rod 84 is interconnected between each attachment point 88 and the two nearest attachment points 86 of the gas turbine engine 18. Thus, in this arrangement, the gas turbine engine 18 is effectively suspended within the interior region of the structural cowling 20 with the tension rods 84 remaining in tension during thermally induced movement of the gas turbine engine 18 relative to the structural cowling 20. As in the case of the arrangement of FIG. 5 for mounting the forward portion of the gas turbine engine 18, various other arrangements can be employed.

With reference to FIGS. 7 and 8, the arrangement of the structural cowling 20 to provide access to the gas turbine engine 18 can be understood. As can be seen in the simplified view of FIG. 7, the structural cowling 20 includes two jackscrew assemblies 92, located near the fore and aft ends of the cowling 20 to extend between adjacent axial boundaries 94 and 96 of the upper cowling unit 24 and the lower cowling unit 26 and two jackscrew assemblies 98, located near the fore and aft ends of the cowling 20 to extend between the adjacent axial boundaries 100 and 102 of the upper cowling unit 24 and the lower cowling unit 26. As shall be described in detail relative to FIGS. 11 through 14, the jackscrews 92 and 98 are operated in unison to lower the lower cowling unit 26 downwardly and away from the upper cowling unit 24 with the jackscrews 98 including integral lock assemblies for uncoupling the axial boundary 100 of the upper cowling unit from the axial boundary 102 of the lower cowling unit. As shown by the phantom lines of FIG. 7, when the integral lock assemblies of the jackscrews 98 are in the unlatched position, the adjoining boundaries of the cowling unit 20 are physically separated from one another and the lower cowling unit 26 can be swung about integral hinges that are included within the jackscrews 92.

Each jackscrew 92 and 98 is gear-driven by a torque tube 104 that extends through the interior of the upper cowling unit 24 from each jackscrew to a transfer unit 106 that is located in the central portion of each axial boundary 94 and 100 of the upper cowling unit 24. Each transfer unit 106 is operated by a drive system which includes a plurality of serially arranged drive rods 108. The drive rods 108 are universally coupled to one another at a plurality of support locations 110 which are circumferentially spaced-apart from one another along the inner wall 34 of the lower cowling unit 26.

As can be seen in both FIGS. 7 and 8, the universally coupled drive rods 108 are driven by a gear system 112, located approximately at the midpoint of curvature of the lower cowling unit 26. More explicitly, the two drive rods 108 extending circumferentially from the gear system 112 each include a bevel gear 114 that is engaged with a gear 116. The gear 116 is mounted on a shaft 118 which projects downwardly through the lower cowling unit 26 with the outer end of the shaft 118 being machined or formed for engagement by a hand crank 120 or a conventional pneumatic or electric cranking tool.

Figure 10:
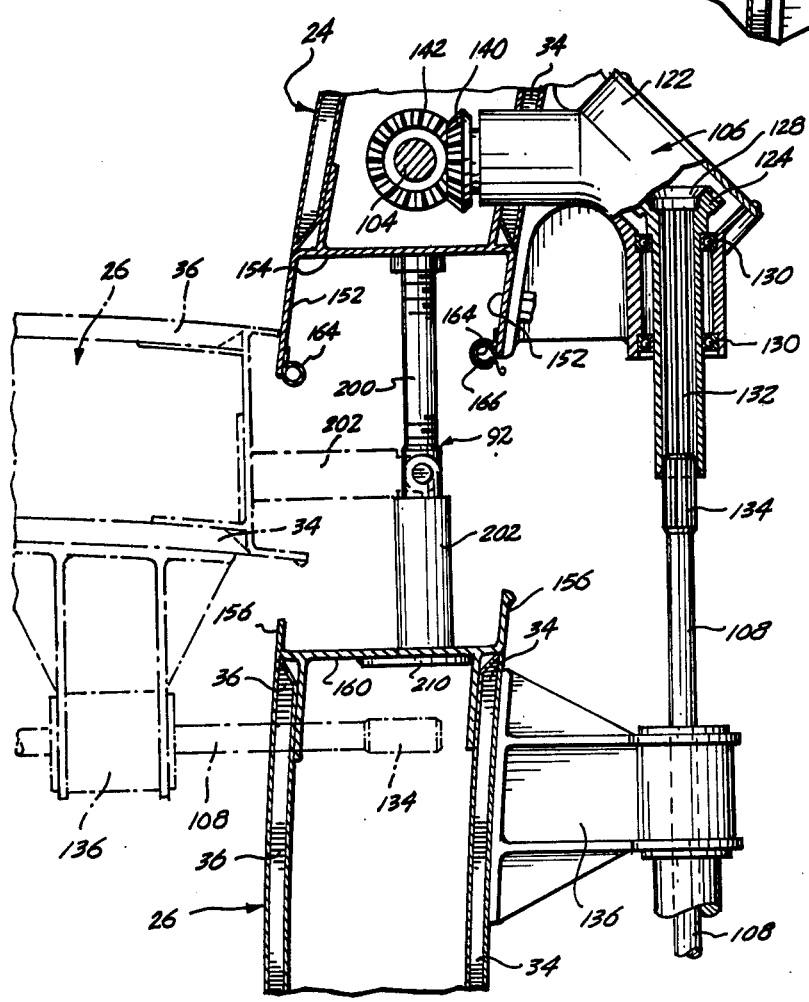
FIG. 10 is a cross-sectional view depicting the jackscrew drive arrangement of FIG. 9 when the lower cowling unit is lowered away from the upper cowling unit and when the lower cowling unit is swung about the hinged jackscrews to provide access to the gas turbine engine.

To lower or raise the lower cowling unit 26, the hand crank 120 (or cranking tool) is engaged with the shaft 118 and activated to rotate the gear system 112, which in turn rotates each of the rods 108 and turns gears within the transfer units 106. As can be seen in FIGS. 9 and 10, each of the transfer units 106 is arranged to drive the torque tube 104 and is further arranged for disengagement by the uppermost drive rods 108 when the lower cowling unit 26 is swung open.

More explicitly, referring to FIGS. 9 and 10, each transfer unit 106 includes a housing 122 that is bolted to the inner wall 34 of the upper cowling unit 24. The housing 122 is arranged to support two gear shafts 124 and 126 with the shafts being substantially orthogonal to one another and coupled to one another by bevel gears 128 that are located on one end of each shaft 124 and 126. The shaft 124 projects downwardly through and is supported by bearings 130 that are pressed into or otherwise retained in the housing 122. The shaft 124 includes an axially extending central opening 132 that is machined for engagement with splines 134 that are formed in the end portion of the uppermost drive rod 108. The uppermost end of the drive rod 108 is journalled in and supported by a journal block 136 which is fastened to and projects inwardly from the inner wall 34 of the lower cowling unit 26.

The gear shaft 126 projects outwardly through and is supported by bearings 138 which are pressed into or otherwise retained in the housing 122. As can be seen in both FIGS. 9 and 10, the housing 122 is configured such that the outermost end of the gear shaft 126 is located in the interior region formed between the inner and outer walls 34 and 36 of the upper cowling unit 24. A bevel gear 140, located on the outermost end of the gear shaft 126, engages with bevel gears 142 which are mounted on the ends of the torque tubes 104.

In view of this arrangement and the previously described jackscrew arrangement of FIG. 7, it can be recognized that, starting with the upper cowling unit 24 and lower cowling unit 26 in the engaged or mated position of FIG. 9, proper rotation of the crank 120 of FIG. 8 causes the uppermost drive rods 108 to rotate the gear shafts 124 and 126 to, in turn, drive the torque tubes 104. As shall be described relative to FIGS. 11 through 14, rotation of the torque tubes 104 causes the lower cowling unit 26 to move downwardly and away from the upper cowling unit 24, i.e., to the position illustrated in FIG. 3 and by the solid lines of FIG. 10. When the integral lock mechanisms of the jackscrews 98 (schematically illustrated in FIG. 7 and in detail in FIGS. 11 and 12) are released, the lower cowling unit 26 can be swung open about the integral hinges of the jackscrews 92. As is illustrated by the phantom lines in FIG. 10, when the lower cowling unit 26 is swung open, the splined region 134 of the uppermost drive rods 108 disengage from the openings 132 of the gear shafts 124. When the lower cowling unit 26 is restored to the closed position, the lower cowling unit 26 is first swung upwardly to engage the splined regions 134 of the drive rods 108 with the machined openings 132 of the gear shafts 124 and the latches of the jackscrews 98 are operated to retain the lower cowling unit 26 in its lowermost position. The crank 120 (FIG. 8) is then operated to drive the transfer units 106 and draw the lower cowling unit 26 upwardly toward the upper cowling unit 24. As the lower cowling unit 24 moves upwardly, the splines 134 of the uppermost drive rods 108 slide upwardly in the machined grooves of the opening 132. As shall be described in more detail hereinafter, preferred embodiments of the invention include a power actuated cable system for swinging the lower cowling unit 26 about the integral hinges of the jackscrews 92 during the cowling opening and closing sequence.

FIG. 11 and FIGS. 12a and 12b depict the detailed structure of the jackscrew assemblies 92 of FIG. 7 and further depict the construction of the structural cowling. As shown in FIGS. 11 and 12, the inner and outer walls 34 and 36 of both the upper cowling unit 24 and the lower cowling unit 26 can be formed of lightweight structural panels such as a honeycomb type material having spaced-apart metal faces separated by and bonded to a cellular interlayer that can be fabricated of either metal or a resinous material. Regardless of the type of panels used, the inner and outer walls 34 and 36 of the structural cowling 30 are generally spaced-apart from one another and joined together by axially extending longerons or sheet metal support members which span the intervening space between the two walls, e.g., the longerons 32 of FIGS. 5, 6 and 8. For example, in FIGS. 11 and 12a, a sheet metal longeron 144, having a somewhat Z-shaped cross-sectional geometry, spans the region between the spaced-apart inner and outer walls 34 and 36 with the oppositely disposed legs thereof extending along and being joined to the inner surfaces of the walls 34 and 36.

As can be seen in both FIGS. 11 and 12a, the axially extending boundary of the upper cowling unit 24 and the axially extending boundary of the lower cowling unit 26 (e.g., boundaries 100 and 102 in FIG. 7) are respectively formed by extruded or cast channels 146 and 148. The channel 146 includes two spaced-apart, upwardly projecting flanges 150 and two spaced-apart, downwardly projecting flanges 152 with the flanges 150 and 152 being joined together by a web region 154. The upwardly projecting flanges 150 are spaced-apart by a distance substantially equal to the distance between the inner and outer walls 34 and 36 of the upper cowling unit 24 and the inner surfaces of the upper cowling unit inner and outer walls are bonded to (or otherwise joined to) the outer surface of the flanges 150. The downwardly projecting flanges 152 are generally spaced-apart from one another and contoured to form an extension of the outer surfaces of the upper cowling unit inner and outer walls 34 and 36.

The channel 148, which forms each axially extending boundary of the lower cowling unit 26, is similar in construction to the channel 146. More explicitly, the channel 148 includes two spaced-apart, upwardly extending flanges 156, which form extensions of the outer surfaces of the lower cowling unit inner and outer walls 34 and 36; two downwardly extending flanges 158, which are spaced inwardly of the flanges 156 for receiving and containing the structural panels that form the lower cowling unit inner and outer walls 34 and 36; and, a web region 160 which extends transversely between the upwardly extending flanges 156 and the downwardly extending flanges 158.

As can be seen in FIGS. 11 and 12a, when the upper cowling unit 24 and the lower cowling unit 26 are drawn together to close the structural cowling 20, the axially extending edges of the flanges 152 of the channel 146 are in alignment with and closely adjacent the edges of the upwardly extending flanges 156 of the channel 148. Thus, when the structural cowling 20 is closed, the channels 146 and 148 effectively form axially extending cavities 162, having a substantially trapezoidal cross-sectional geometry. As shall be described in detail relative to FIGS. 15 and 16, a plurality of interlock mechanisms are axially spaced-apart along the cavities 162 to securely latch the lower cowling unit 26 to the upper cowling unit 24 when the cowling is in the closed position.

When the upper cowling unit 24 and lower cowling unit 26 are latched together in the closed position, an airtight seal is formed by seal strips 164 which are axially disposed between adjacent flanges of the channels 146 and 148. Each of the seal strips 164 are constructed of neoprene or other suitable pliant material and in the embodiments of FIGS. 11 and 12 are mounted to the axially extending edges of the flanges 152 of the upper cowling unit channel 146. More explicitly, each of the seal strips 164 is a strip of pliant material formed to have a somewhat U-shaped cross-sectional geometry with one of the boundary surfaces of each seal strip 164 being attached to an axially extending edge of the flanges 152 and the closed portion thereof projecting inwardly into the axially extending cavity 162. When the lower cowling unit 26 is positioned against and latched to the upper cowling unit 24, the axially extending boundaries of the lower cowling unit flanges 156 engage with and force the second boundary surface of each seal strip 164 into contact with the surface of the seal strip that is attached to the upper cowling unit channel 148. Thus, as can be seen in FIGS. 11 and 12, each seal strip 164 is substantially tubular in cross-sectional geometry whenever the lower cowling unit 26 and upper cowling unit 24 are in the closed position with the substantially circular portion of the cross-sectional geometry extending into the cavity 162. In this arrangement, since the pressure exerted on the exterior portion of the structural cowling 20 (ambient air pressure) is generally less than the pressure within the cavity 162 during flight of the aircraft, the seal strip 164 that it is located between the outermost flanges 152 and 156 will be compressed toward the flanges 152 and 156 to seal the cavity 162 and hence effectively pressurize outer wall 36 of the structural cowling 20. On the other hand, during aircraft operation, the pressure within the interior region of the structural cowling 20 will generally be greater than the pressure within the cavity 162 to thereby force the seal strip 164 that is located between the innermost flanges 152 and 156 inwardly into the cavity 162. To contain the seal 164 as it is forced inwardly and thereby effectively pressurize the structural cowl 20, a retaining strip 166 extends axially along the inner surface of the innermost flange 152 of the upper cowling unit channel 146. As can be seen in FIGS. 11 and 12, the retaining strip 166 is formed to extend downwardly in an arcuate path across the juncture formed by the axially extending edges of the innermost flanges 152 and 156. Thus, when the structural cowling 20 is in the closed position, pressure differences across this boundary region force the seal strip 164 inwardly against the arcuate surface of the retaining strip 166 to thereby form an airtight seal.

As depicted in FIGS. 11 and 12a, each jackscrew assembly 98 includes a threaded rod 168 that extends vertically through the intervening region between the spaced-apart inner and outer walls 34 and 36 of the upper and lower cowling units 24 and 26. The upper threaded region of the rod 168 is engaged with internal threads in a central opening of the bevel gear 170 with the bevel gear being rotatably retained in a bearing 172 which is mounted to and passes through the web 154 of the upper cowling unit channel 146. After passing through the bevel gear 170, the rod 168 extends downwardly through the cavity 162, passing through an opening 174 in the web 160 of the lower cowling unit channel 148 and into the interior region of the lower cowling unit 26 that is formed between the spaced-apart inner and outer walls 34 and 36.

Each rod 168 transits from a substantially circular cross-sectional geometry along the upper threaded region thereof to an elliptical or rectangular cross-sectional geometry along the lower portion thereof with the major planar surfaces of the rectangular cross-sectional geometry (or the major axis of the elliptical cross section geometry) beng substantially perpendicular to the inner wall 34 of the lower cowling unit 26. A stud 176 projects orthogonally from one of the major planar surfaces of the lower region of each rod 168 to form a portion of a locking mechanism which attaches the rods 168 to the lower cowling unit 26. As can best be seen in FIG. 12B, each stud 176 includes a substantially circular shaft 178 having a disc-like head region 180 of greater radius than that of the circular shaft 178. Since the planar surfaces of the lower end of the rod 168 and the planar surfaces of the disc-like head region 180 are substantially parallel to one another and are spaced apart by the length of the shaft 178, an annular groove 182 is formed between the inner surface of the head region 180 and the surface of the rod 168.

With reference to FIG. 11, when the upper cowling unit 24 and the lower cowling unit 26 are linked together via the rods 168, the head region 180 of the stud 176 is engaged by a keeper 184 of substantially C-shaped cross-sectional geometry which is mounted to or formed in each end of a torque tube 186. As discussed relative to FIG. 7, the torque tube 186 axially spans the region between the two jackscrew assemblies 98 and operates the integral locking mechanisms of the jackscrew assemblies 98. As shown in FIGS. 11 and 12, the torque tube 186 is securely connected to the lower cowling unit 26 by a number of bearing fixtures 188 that are affixed to the innermost flange 158 of the lower cowling unit channel 148 and rotatably support the torque tube 186. A central region 190 of the torque tube 186 is machined for engagement by a tool such as a conventional open-end wrench. Access to the machined region 190 is provided through a removable access panel 192 located in the central region of the lower cowling unit 26 (FIG. 7).

The keepers 184 extend from each end of the torque tube 186 and are configured for engagement with (and disengagement from) the studs 176 of each rod 168 of the jackscrew assemblies 98. More explicitly, as illustrated in FIG. 12B, each keeper 184 extends coaxially from the torque tube 186 such that rotation of the torque tube 186 causes the open region of each C-shaped keeper 184 to rotate in a plane substantially perpendicular to the inner wall 34 of the lower cowling unit 26, which plane is substantially coincident with the disc-like head region 180 of a stud 176. A groove 194, extending inwardly into the interior axial boundaries of the keepers 184, is dimensioned for receiving the head region 180 of the stud 176. When the lower cowling unit 26 has previously been opened and is to be swung upwardly to join the lower cowling unit 26 with the upper cowling unit 24, the torque tube 186 is rotated to align the open region of the C-shaped keepers 184 with the head regions 180 (FIG. 12B). The lower cowling unit 26 is then moved upwardly to engage the head regions 180 in the grooves 194 of the keepers 184 and the torque tube 186 is rotated approximately 180° to rotate the keepers 184 such that the closed portion of the C-shaped cross-sectional geometry encircles the upper portion of the head regions 180 to thereby lock the threaded rods 168 to the torque tube 186 (FIG. 11). Since the torque tube 186 is securely mounted to the lower cowling unit 26 by the bearing fixtures 188, the lower cowling unit 26 is thus interconnected with the upper cowling unit 24 and can be raised into engagement therewith by turning the crank 120 to simultaneously operate each jackscrew assembly 92 and 98. As shown by the phantom lines of FIG. 11, during the sequence for opening the lower cowling unit 26, the jackscrews 92 and 98 are operated in unison by the crank 120 to lower the lower cowling unit 26 away from the upper cowling unit 24. When the lower cowling unit 26 is in its most downwardly position, the torque tube 186 is rotated 180° such that the heads 180 of the studs 176 can pass from the keepers 184. As the lower cowling unit 26 is then swung open about the hinges of the jackscrew assemblies 92, the lower portion of the rods 168 pass through the openings 174 in the lower cowling unit channel 148 and the lower cowling unit swings free of the upper cowling unit 24.

The jackscrew assemblies 92, which as previously described join the lower cowling unit 26 and upper cowling unit 24 along one side of the structural cowling 20 and include integral hinges to permit the lower cowling unit 26 to be swung open, are illustrated in FIGS. 13, 14, and 15. It can be noted in viewing FIGS. 13 and 14 that each jackscrew assembly 92 primarily differs from the jackscrew assemblies 98 in the construction of the rod member that physically interconnects the lower cowling unit 26 and the upper cowling unit 24. More specifically, like the rods 168 of the jackscrew assemblies 98, a rod 196 of the jackscrew assembly 92 includes an upper threaded end region that is engaged with internal threads in a central opening of a bevel gear 170. As in the jackscrew assemblies 98, the bevel gear 170 is supported for rotation within the bearing 172 that is affixed to the web 154 of the upper cowling unit channel 146 with the bevel gear 170 being engaged with a mating bevel gear 197 attached to the end of the torque tube 104.

As depicted in FIGS. 13 and 14, the rods 196 of the jackscrew assemblies 92 differ from the rods 168 of the jackscrew assemblies 98 in that a hinge joint 198 is formed immediately adjacent the threaded end region of each rod and in that the lower end of each rod 196 is rigidly affixed to the web 160 of the lower cowling unit channel 148. More explicitly, each rod 196 includes an upper threaded section 200 of substantially circular cross section which is pivotably joined to a lower rod section 202. As can be best seen in FIG. 15, the lower end of the threaded section 200 includes a rectangular hinge block 204 extending axially downward with the major planar surfaces thereof substantially perpendicular to the outer wall 36 of the lower cowling unit 26. The hinge block 204 extends into a rectangular groove 203 defined between two spaced-apart flanges 205 that are formed in and extend upwardly from the upper end of the lower rod section 202. A hinge pin 206 extends through an appropriately sized opening in the flanges 205 of the lower rod section 202 and the hinge block 204 to form the hinge joint 198 by pivotably attaching the upper end of the lower rod section 202 to the lower end of the upper threaded section 200. As can be seen in FIGS. 13 through 15, the lower end of the lower rod section 202 passes through an appropriately sized opening in the web 160 of the lower cowling unit channel 148. A flange 210, mounted to and extending orthogonally outwardly from the terminus of the lower rod section 202, is joined to the lower surface of the web 160 by conventional fastening techniques to affix the lower rod section 202 to the lower cowling unit 26.

In view of the above-described arrangement, it can be recognized that when the crank 120 is turned (FIG. 7), the jackscrew assemblies 92 and 98 are operated in unison by the torque tubes 104 to raise or lower the lower cowling unit 26. When the lower cowling unit is to be swung open, the lower cowling unit is driven to its lowermost position (FIGS. 3 and 14) by operation of the crank 120, the lock mechanism of each jackscrew assembly 98 is released by rotating the torque tube 186, and, as is shown by the phantom lines of FIG. 14, the lower cowling unit 26 can be swung about the hinge joints 198 of the jackscrew assemblies 92 to expose the gas turbine engine for service, maintenance, or repair procedures.

Because of the mass of the lower cowling unit 26, preferred embodiments of this invention include a pneumatically or electrically powered actuator system for swinging the lower cowling unit 26 about the integral hinges of the jackscrews 92 whenever the lower cowling unit 26 is opened or closed. One such actuator system, advantageously configured for swinging the lower cowling unit 26 open and closed and also for raising and lowering the gas turbine engine 18 between its mounting position within the structural cowling 20 and ground level, is schematically depicted in FIG. 7 and depicted in more detail in FIGS. 20 through 22.

Referring to FIG. 7, the depicted actuator system includes two powerdriven cable drums or winches 350 which are mounted to the inner wall 34 of the upper cowling unit 24 near each end of the structural cowling 20. Each winch 350 includes a cable 352 which is connected to the winch take-up drum and a mounting bracket 354 located along the axial boundary 102 of the lower cowling unit 26. During the cowling opening and closing sequence, the winches 350 are actuated to raise or lower the lower cowling unit 26 between the previously described position in which the lower cowling axial boundary 102 is positioned adjacent the upper cowling unit axial boundary 100 and a free hanging position.

To control movement of the lower cowling unit 26 beyond the free hanging position, two cable drums 356 are mounted in axial alignment with one another along the opposite side of the upper cowling unit 26. As depicted in FIG. 7, the cable drums 356 are each located near the fore and aft ends of the structural cowling 20 and are concentrically mounted to torque tubes 358 that extend axially from the central region of the upper cowling unit 24. A conventional pneumatic or electric rotary actuator 360 is coupled to the torque tubes 358 by a gear box 362 to rotate the cable drums 356. As the cable drums 356 are rotated, cables 364 wind or unwind to position the lower cowling unit 26 above the free hanging position.

More specifically and with reference to FIG. 20, when the lower cowling unit 26 is swung upwardly from or lowered downwardly to the free hanging position (shown in solid lines in FIG. 20), the winches 350 are simultaneously operated to wind and unwind the cables 352. As the cables 352 wind or unwind, the lower cowling unit 26 swings about the hinges of the jackscrews 92. As shown in FIG. 20, the cables 352 are routed circumferentially around the engine 18 by rollers or idler pulleys 366 that are mounted to an engine flange 368 to guide the cables 352 and prevent chafing. To swing the lower cowling unit 26 beyond the free hanging position, the cables 364 pass outwardly through the walls of the upper cowling unit 24 and pass circumferentially downward to a suitable attachment point 374 in the interior of the lower cowling unit 26. To prevent chafing of the cables 364, each cable passes through fairleads 370 mounted in the upper cowling 24 and fairleads 372 mounted within the lower cowling unit 26.

As can be seen in FIG. 21 when the cable drums 356 are utilized to swing the lower cowling unit above the free hanging position, both the cables 352 and 364 are maintained in tension to stabilize the lower cowling unit 26 against external forces such as wind. In this respect, the winches 350 are generally operated in unison with the cable drums 365 during this portion of the opening or closing sequence.

As illustrated in FIGS. 21 and 22, the winches 350 not only provide for swinging movement of the lower cowling unit 26, but also facilitate the raising and lowering of an engine 18 during an engine removal or installation procedure. In particular, during such engine installation or removal procedure, the lower cowling unit 26 is swung to the fully open position, the cables 352 are disconnected from the lower cowling connections 354 and reconnected to flanges 376 that extend inwardly from the inner wall of the upper cowling 324 at a position opposite each of the winches 350. Connected in this manner, the cables 352 each form downwardly-extending loops which pass through the pulleys 366 to encircle the lower portion of the engine 18. When the engine support apparatus which interconnects the engine 18 with the upper cowling unit 24 is removed (e.g., the forward and aft engine mounts depicted in FIGS. 5 and 6), the engine 18 can be lowered to the ground 378 and placed on a conventional trailer or dolly 380.

When an engine is to be installed within the structural cowling 20, the engine is positioned below the structural cowling, the cables 352 are routed around the rollers or pulleys 366 and connected to the upper cowling connection points 376. The winches 350 can then be operated to hoist the engine into position within the structural cowling for connection to the upper cowling unit 24, and the cables 352 can be reconnected to the lower cowling unit attachment point 354 for swinging the lower cowling unit 26 to the closed position.

Referring again to FIG. 7, a plurality of interlock assemblies 212 are spaced along each axial boundary 96 and 102 of the lower cowling unit 26 for engaging with the upper cowling unit 24 and securely latching the lower cowling unit 26 to the upper cowling unit 24. The interlocks 212 of each axial boundary 96 and 102 are gear driven by torque tubes 214 which are respectively disposed along the lower cowling unit boundaries 96 and 102 to pass between the spaced-apart interlocks 212. Each torque tube 214 is driven through a set of bevel gears (indicated at 216 in FIG. 7) which is operated by hand crank 218 or a conventional pneumatically or electrically powered cranking tool that is inserted into an opening in the upper cowling unit 24 to engage the bevel gear drive system. Whenever the interlocks 212 are not engaged to latch the lower cowling unit 26 to the upper cowling unit 24, warning flags 220 project outwardly from the axial boundaries of the lower cowling unit 26.

Referring now to FIGS. 16 and 17, each interlock 212 includes a substantially circular shaft 222 which extends through bearing surfaces within two spaced-apart, upwardly projecting flanges 224 of a support frame 226 that is mounted to the lower cowling unit channel 148. Each end of the shaft 222 projects orthogonally outward from the outer surface of the flanges 224 and includes a keeper 228 that is substantially identical in geometry to the keepers 184 of the jackscrew assemblies 98. In particular, each keeper 228 is substantially C-shaped in geometry when viewed along the axial centerline of the shaft 222, with the closed, curved portion of the C-shaped boundary being substantially concentric with the shaft 222. As in the case of the jackscrew keepers 184, the keepers 228 include a groove 230 along the entire periphery of the inner axial surface with the groove 230 extending radially outwardly toward the outer axial surface of the keepers 228.

A gear 232, concentrically affixed to the portion of the shaft 222 that extends between the two spaced-apart flanges 224, is engaged with a worm gear 234 which is formed in the axially extending torque tube 214. As can be best seen in FIG. 16, each torque tube 214 is supported in bearing fixtures 236 which extend upwardly from and are mounted to spaced-apart positions along the upper surface of the web 160 of the lower cowling unit channel 148. Each torque tube 214 passes through a rectangular opening 238 formed in the lower portion of the support frames 224 and engages the gears 232 through a slot 240 in the upper boundary wall of the rectangular opening 238.

As can be further seen in FIG. 16, the gear system for driving the torque tubes 214 includes a bevel gear 242, mounted in concentric relationship with the end portion of each torque tube 214. The bevel gears 242 are engaged with a bevel gear 244 that is located on one end of a shaft 246 having its axial centerline positioned substantially orthogonal to the axial centerline of the torque tubes 214. The shaft 246 is supported within a bearing support 216 with the outwardly projecting end region of the shaft 246 being machined for engagement by the crank 218 (FIG. 7). A small opening 250 in the outermost, downwardly extending flange 152 of the upper cowling unit channel 146 permits the crank 218 to be inserted over the end region of the shaft 246. As the crank 218 is turned, the torque tubes 214 are driven through the gear system 216 to rotate the interlock shafts 222.

With continued reference to FIG. 16, the grooves 230 of the keepers 238 are dimensioned for engaging disclike head regions 252 of studs 254, which project inwardly from the downwardly extending flanges 152 of the upper cowling unit channel 146. Each stud 254 is substantially identical in geometry to the studs 176 of the jackscrew assemblies 98. Thus, when the lower cowling unit 26 is to be raised into position against the upper cowling unit 24 by means of the jackscrew assemblies 92 and 98, the openings in the keepers 228 are positioned for receiving the head regions 252 of the upper cowling unit studs 254. When the lower cowling unit 26 is positioned against the upper cowling unit 24 (FIG. 17), the crank 218 or a conventional power cranking tool is utilized to turn the torque tubes 214 until the C-shaped keepers 228 are rotated approximately 180° to encircle the upper portion of the head regions 252 of the studs 254. Preferably, the grooves 230 of the keepers 228 are somewhat eccentic in geometry such that the lower cowling unit 26 is forced upwardly to compress the seal strips 164 as the interlocks 212 latch the lower cowling unit 26 to the upper cowling unit 24.

When the lower cowling unit 26 is to be opened for access to the gas turbine engine 18, mounting arm assemblies 30 of FIG. 5 and tension rods 84 of FIG. 6 which interconnect the gas turbine engine 18 with the lower cowling unit 26 are disconnected. Each gear system 216 is then operated by the crank 218 to rotate the interlocks 212 and free the associated axial boundaries of the upper and lower cowling units 24 and 26 from one another. When the lower cowling unit 26 has been released from the upper cowling unit 24, the lower cowling unit 26 is lowered away from the upper cowling unit 24 by means of the crank 120 which drives the jackscrew assemblies 92 and 98. As previously described, when the lower cowling unit 26 is in its lowermost position, the torque tube 186 is operated to release the lower end of the jackscrew assemblies 98 and separate the lower cowling unit 26 from the upper cowling unit 24 along one axial edge of the structural cowling 20. The previously described actuator system is then operated to open and close the lower cowling unit 26.

To provide an indication that the lower cowling unit 26 is not securely latched to the upper cowling unit 24, warning flags 220 positioned, for example, adjacent the forwardmost and aftmost interlocks 212, automatically extend from the upper cowling unit 24 when the C-shaped keepers 228 do not encompass the upper portion of the head regions 252 of the upper cowling unit studs 254. As depicted in FIGS. 16 and 17, each warning flag 220 is mounted within a recessed region 256 formed in the outer wall 36 of the upper cowling unit 24. Each flag 220 is a substantially flat metal panel having a hinge rod 258 extending along and affixed to one edge of the rectangular flag 220. The ends of the hinge rod 258 extend through small bearings 260 at the upper and lower boundaries of recess 256 to permit rotation of the warning flag 220 to a position in which the warning flag projects orthogonally outward from the outer wall 36 of the upper cowling unit 24 and permit rotation of the warning flag 220 such that the warning flag is contained within recess 256.

In the depicted arrangement, a torsion spring 262 surrounds the lower portion of the hinge rod 258 to bias the flag 220 in the outwardly projecting or warning position. To retract each flag 220 when the interlocks 212 are properly operated to securely latch the lower cowling unit 26 to the upper cowling unit 24, a small tabular projection 264 extends outwardly from the centermost portion of the closed, curved region of the outermost C-shaped keeper 228. As the C-shaped keeper 228 is rotated to engage the associated upper cowling unit stud 254, the tabular projection 264 contacts an orthogonally extending end region 266 of the hinge rod 258 and causes the rod 258 to rotate, swinging the warning flag 220 inwardly toward the recess 256. As the keepers 228 are fully engaged with the upper cowling unit studs 254, the flags 220 swing through an angle of approximately 90° so that each warning flag 220 is positioned substantially parallel to the outer wall 36 of the upper cowling unit 24 and is fully contained within the recess 256.

In some applications of the invention, it may be advantageous to operate the interlocks 212 and the jackscrew assemblies 92 and 98 from a single drive point rather than operating the jackscrew assemblies 92 and 98 with the crank-driven, universally-joined rods 108 of FIG. 7 and separately driving the interlocks 212 of each side of the structural cowling 20 with a geared torque tube arrangement in the manner previously described herein. In this respect, FIGS. 18 and 19 depict an alternative drive arrangement in which the crank-driven, universally-joined drive rods 108 of FIG. 7 selectively drive the jackscrew assemblies 92 and 98 or simultaneously drive both sets of interlocks 212. In the arrangement of FIGS. 18 and 19, a drive selector mechanism (generally denoted by the numeral 270) is mounted within a frame unit 272 in engagement with the two uppermost drive rods 108. A selector shaft 274 projects outwardly into a recess 276 in the outer wall 36 of the lower cowling 26 with the outer end of the selector rod 274 being configured for engagement by a hand crank 275 or by a conventional pneumatically or electrically powered crank tool. The inboard end of the shaft 274 includes a pinion gear 280 which is engaged with a rack 278 that is integrally formed or affixed to the lower boundary of a shift fork 282. By rotation of the crank 275, the shift fork 282 is positioned along an axially extending shaft 284 to transfer rotation of the drive rods 108 to either the previously described transfer units 106, which drive the jackscrews 92 and 98 or to the previously described torque tubes 214 which operate the interlocks 212.

More explicitly, the drive selector frame 272 is mounted to the inner wall 34 of the lower cowling unit 26 and projects inwardly into the structural cowl 20 to form a substantially rectangular cavity 286 which extends axially along a portion of the lower cowling wall 34. A shaft 288, having splines machined in the upper end thereof for engagement with the opening 132 of the downwardly extending transfer unit shaft 124 (FIG. 10), extends upwardly through the upper boundary wall 290 of the frame 272. As can best be seen in FIG. 19, the lower end of the shaft 288 includes a bevel gear 292 engaged with a bevel gear 294 which is mounted on the axially extending shaft 284. The bevel gear 294 is not interconnected with the shaft 284, but is free to rotate thereabout unless locked to the shaft 284 by a shaft lock 296 which is operated by means of the hand crank 275. In particular, the forward portion of the bevel gear 294 includes an inwardly extending, cone shaped opening 298 which includes a number of locking grooves 300 machined into the boundary wall of the opening 298. The shaft lock 296 includes a matching, conically contoured region 302 having a series of outwardly extending ridges or splines 304 which are dimensioned to fit within the grooves 300 of the bevel gear 294. To permit axial displacement of the shaft lock 296 and hence engagement with the bevel gear 294, the shaft lock 296 is mounted on a splined region 306 of the shaft 284 with the interior opening of the shaft lock being machined to match the splined region 306. In operation, the shaft lock 296 is slid axially along the shaft 284 to engage the bevel gear 294 by the shift fork 282 which engages and partially encircles a circumferential groove 308 in the central portion of the shaft lock 296. The lower portion of the shift fork 282 includes the rack 278 which is contained within an axially extending track 310 formed in the lower boundary wall 312 of the frame 272. As previously described, when the crank 275 is turned, the rack 278 is moved in the axial direction by the pinion 280 to slide the shaft lock 296 along the shaft 284.

The forward portion of the shaft lock 296 includes a second conically contoured region 314 having outwardly extending splines 316 with the conical region 314 being configured for engagement with a matching conical opening 318 in a bevel gear 320 when the shaft lock 296 is driven to its forwardmost position by operation of the shift fork 282. The bevel gear 320 is configured in the same manner as the bevel gear 294, being free to rotate about the shaft 284 unless engaged by the shaft lock 296. As can best be seen in FIG. 18, a shaft 322 having a bevel gear 324 mounted on one end thereof which is engaged with the bevel gear 320 extends outwardly through the inner wall 34 of the lower cowling unit 26. Another bevel gear 326, mounted to the outward end of the shaft 322, is engaged with a bevel gear 328 which drives a shaft 330 that passes vertically upward through a bearing support 332 and through the web 160 of the lower cowling unit channel 148. A bevel gear 334, mounted to the upper end of the shaft 330 is engaged with the bevel gears 242 which drive the torque tubes 214 to operate the interlocks 212 in the previously described manner.

Thus it can be seen that the interlocks 212 are operated whenever the crank 275 is utilized to position the shaft lock 296 in the forwardmost position and the shaft 284 is rotated. Further, it can be seen that the torque tubes 104 are rotated to operate the jackscrew assemblies 92 and 98 whenever the hand crank 275 is utilized to position the shift lock 296 in the rearmost position and the shaft 284 is rotated. As can be seen in FIG. 19, to drive the axially extending shaft 284 with the uppermost rods 108 of the universally joined drive system of FIGS. 7 and 8, the forward end of the shaft 284 includes a bevel gear 336 which is engaged with a bevel gear 338 that is mounted to the end of the uppermost drive rods 108.

It will be recognized by those skilled in the art that the embodiment of the invention described herein is exemplary in nature and that many variations therein can be practiced without exceeding the scope and spirit of the invention. For example, various internal structure and skin panels can be utilized to form the structural cowling 20, the important criteria being that the structural cowling 20 is configured to support axially extending components of the engine arrangement, such as the air intake 16 and exhaust system 22 of FIG. 1 with the structural cowling 20 isolating the gas turbine engine contained within the cowling from static and dynamic loading exerted by such components. Further, as illustrated by the alternative drive arrangement of FIGS. 18 and 19, various apparatus can be utilized to operate jackscrew and interlock systems to permit the lower cowling unit 26 to be swung open for access to the gas turbine engine 18.

What is claimed is:

1. In a jet propelled aircraft wherein ambient air is supplied to a gas turbine engine by air inlet means extending forwardly of said gas turbine engine, said gas turbine engine supplying exhaust gasses to exhaust system means extending rearwardly of said gas turbine engine for discharging said engine exhaust gasses as a rearwardly directed fluid stream for propelling said aircraft, an improved engine installation configured and arranged for substantially isolating said gas turbine engine from the static and dynamic loading forces exerted by said air inlet means and said exhaust system means, said improved engine installation comprising:

a structural cowling rigidly affixed to said aircraft and depending therefrom for receiving and bearing substantially all said static and dynamic loading forces exerted by said air inlet means and said exhaust system means, said structural cowling having forward and rearward faces respectively including mounting means for receiving and supporting said air inlet means and said exhaust system means, said mounting means being configured and arranged to couple substantially all of said static and dynamic loading forces exerted by said air inlet means and said exhaust system means to said structural cowling, said structural cowling including a central opening extending between said front and rear faces; and engine mounting means for supporting said gas turbine engine within said central opening of said structural cowling with said gas turbine engine in fluid communication with said air inlet means and said exhaust system means, said engine mounting means being structurally distinct from and independent of said mounting means for receiving and supporting said air inlet means and said exhaust system means.

2. The improved engine installation of claim 1 wherein said engine mounting means includes means for permitting thermally induced movement of said gas turbine engine relative to said structural cowling.

3. The improved engine installation of claim 1 wherein said structural cowling includes first and second axially extending cowling sections with said first cowling section being affixed to said aircraft, each of said first and second axially extending cowling sections including first and second axially extending boundary edges, said first and second cowling sections being joinable to one another along said first axially extending boundary edges and along said second axially extending boundary edges for enclosing and supporting said gas turbine engine, said second cowling section being mounted for swinging movement about one of said axially extending boundary edges of said first cowling section for providing access to said gas turbine engine.

4. The improved engine installation of claim 3 wherein said structural cowling includes a first and second set of jackscrews, each of said first and second set of jackscrews including at least two jackscrews, said jackscrews of said first set of jackscrews being spaced apart from one another and mounted to link said first axially extending boundary edges of said first cowling section with said first axially extending boundary edge of said second cowling section, said jackscrews of said second set of jackscrews being spaced apart from one another and mounted to link said second axially extending boundary edge of said first cowling section with said second axially extending boundary edge of said second cowling section, said first and second sets of jackscrews being operable to position said first boundary edges of said first and second cowling sections and said second boundary edges of said first and second cowling sections adjacent one another and being operable to move said second cowling section outwardly from said first cowling section to a position at which said first and second boundary edges of said first cowling section are respectively spaced apart from and respectively parallel to said first and second boundary edges of said second cowling unit.

5. The improved engine installation of claim 4 wherein each of said jackscrews of said first set of jackscrews includes locking means, said locking means being operable for connecting each jackscrew of said first set of jackscrews to said first axially extending boundary edge of said second cowling section and being operable for releasing each jackscrew of said first set of jackscrews from said first axially extending boundary edge of said second cowling section, and wherein each jackscrew of said second set of jackscrews includes hinge means, said second cowling section being swingable about said hinge means of each of said jackscrews of said second set of jackscrews when said first and second set of jackscrews are operated to position said second cowling section outwardly of said first cowling section.

6. The improved engine installation of claim 5 wherein said structural cowling further includes jackscrew drive means for operating all of said jackscrews of said first and second set of jackscrews in unison.

7. The improved engine installation of claim 6 wherein said jackscrew drive means includes first and second torque tubes, said first torque tube extending between each of said spaced-apart jackscrews of said first set of jackscrews, said second torque tube extending axially between each of said spaced-apart jackscrews of said second set of jackscrews, said first torque tube being interconnected with each jackscrew of said first set of jackscrews to operate each of said jackscrews of said first set of jackscrews as said torque tube is rotated, said second torque tube being interconnected with each jackscrew of said second set of jackscrews to operate each jackscrew of said second set of jackscrews as said second torque tube is rotated, said jackscrew drive means further including means for simultaneously rotating said first and second torque tubes.

8. The improved engine installation of claim 7 wherein said means for simultaneously rotating said first and second torque tubes includes a plurality of rotatable rods serially connected and universally coupled to one another, said serially connected rods being positioned in a plane substantially transverse to said axially extending first and second boundary edges of said second cowling section and extending peripherally about that portion of said central opening of said structural cowling that is included in said second cowling section, said universally coupled rods including a first endmost rod engaged with said first torque tube for rotating said first torque tube as said universally coupled rods are rotated and including a second endmost rod engaged with said second torque tube for rotating said second torque tube as said universally coupled rods are rotated, said means for simultaneously rotating said first and second torque tubes further including cranking means for rotating said universally coupled rods, said cranking means being positioned along said peripherally extending, universally coupled rods.

9. The improved engine installation of claim 5 wherein said structural cowling further includes a first and second plurality of interlocks for securely latching said second cowling section to said first cowling section when said first and second cowling sections are to be joined together and for releasing said second cowling section from said first cowling section when said structural cowling is to be opened for access to said gas turbine engine, the individual interlocks of said first plurality of interlocks being spaced-apart from one another and mounted along said first axially extending boundary edge of one of said first and second cowling sections, the individual interlocks of said second plurality of interlocks being spaced-apart from one another and mounted along the second axially extending boundary edge of one of said first and second cowling sections, those ones of said first and second axially extending boundary edges of said first and second cowling sections not including said interlocks having engagement means mounted thereon for engagement by an associated one of said interlocks.

10. The improved engine installation of claim 9 wherein said structural cowling further includes at least one warning flag operatively associated with said first plurality of interlocks and at least one warning flag operatively associated with said second plurality of interlocks, each of said warning flags arranged for deployment from said structural cowling to provide a visual warning when said associated plurality of interlocks do not fully engage said engagement means, each of said warning flags arranged for retraction to a non-extended position when said associated plurality of interlocks are fully engaged with said engagement means.

11. The improved engine installation of claim 9 wherein said structural cowling further includes first interlock drive means for simultaneously operating said first plurality of interlocks and second interlock drive means for simultaneously operating said second plurality of interlocks.

12. The improved engine installation of claim 11 wherein each interlock of said first plurality of interlocks is mounted to said first axially extending boundary edge of said second cowling section and wherein each interlock of said second plurality of interlocks is mounted to said second axially extending boundary edge of said second cowling section, said engagement means associated with said first and second pluralities of interlocks being respectively mounted along said first and second axially extending boundary edges of said first cowling section, each of said interlocks of said first and second plurality of interlocks including a rotatable shaft position for receiving said associated engagement means of said first cowling section, each rotatable shaft of said first and second plurality of interlocks being respectively rotatable by said first and second interlock drive means to securely join said rotatable shafts with said engagement means for securely interconnecting said first and second cowling sections.

13. The improved engine installation of claim 12 wherein said first interlock drive means includes a first torque tube for simultaneous operation of each of said interlocks of said first plurality of interlocks and wherein said second interlock drive means includes a second torque tube for simultaneous operation of each of said interlocks of said second plurality of interlocks, said first and second torque tubes respectively extending along said first and second axially extending boundaries of said second cowling section, said first and second torque tubes respectively engaged with said rotatable shafts of said first and second plurality of interlocks for rotating said shafts of said first plurality of interlocks when said first torque tube is rotated and for rotating said shafts of said second plurality of interlocks when said second torque tube is rotated.

14. The improved engine installation of claim 13 wherein said first and second interlock drive means each include gear drive means arranged for engagement by crank means, each of said gear drive means coupled to one of said first and second torque tubes for operating said first and second plurality of interlocks, said structural cowling including access means through which said crank means can be engaged with said gear means.

15. The improved engine installation of claim 13 wherein said structural cowling includes a third and fourth rotatable torque tube for respectively rotating said first and second sets of jackscrews, said third and fourth rotatable torque tubes respectively extending along said first and second axially extending boundary edges of said first cowling section with said third torque tube in operational engagement with each of said jackscrews of said first set of jackscrews and said fourth torque tube in operational engagement with each of said jackscrews of said second set of jackscrews, said structural cowling further including means for selectively driving said first and second torque tubes in unison with one another to operate said interlocks of said first and second plurality of interlocks and for driving said third and fourth torque tubes in unison with one another to simultaneously operate said first and second set of jackscrews.

16. The improved engine installation of claim 15 wherein said means for selectively operating said first and second pluralities of interlocks and said first and second set of jackscrews includes a plurality of rods serially joined together and having a universal joint between adjacent ones thereof, said plurality of serially joined-together rods extending peripherally along the interior of that portion of said central opening of said cowling that is defined by said second cowling section, said plurality of serially interconnected rods being positioned in a plane transverse to said first and second axially extending boundary edges of said second cowling section, said second cowling section including means for rotating said serially joined-together rods, said means for selectively operating said first and second plurality of interlocks and said first and second set of jackscrews further including first and second selector means respectively driven by the first and second endmost rods of said plurality of serially joined together rods, said first and second selector means being operable to couple rotative movement of said plurality of serially jointed-together rods to said first and second torque tubes for operating said first and second plurality of interlocks and being operable to couple rotative movement of said plurality of serially joined-together rods to said third and fourth torque tubes for simultaneously operating said first and second set of jackscrews.

17. The improved engine installation of claim 5 further comprising actuator means operable for swinging said second cowling section about said hinge means of each of said jackscrews of said second set of jackscrews.

18. The improved engine installation of claim 17 wherein said actuator means include first and second cable means mounted within said first cowling section, each of said first and second cable means having a cable extending therefrom with the end of said cables being connectable to a portion of said second cowling section proximate to said first boundary edge of said second cowling section, said first and second cable means including means for extending and retracting said cables of said first and second cable means to swing said second cowling section between said position in which said first and second boundary edges of said first and second cowling sections are spaced apart from one another in substantially parallel relationship and an equilibrium position which said second cowling section assumes under the force of gravity, said actuator means further including third and fourth cable means mounted within said first cowling unit, each of said third and fourth cable means having a cable extending peripherally along said second cowling section with the end of each cable of said third and fourth cable means being connected to said second cowling section, said third and fourth cable means each further including means for extending and retracting said cables of said third and fourth cable means to swing said second cowling section to positions beyond said equilibrium position.

19. The improved engine installation of claim 18 wherein said first and second cable means are positionable to encircle the lower portion of said gas turbine engine for raising and lowering said gas turbine engine during procedures for installing and removing said gas turbine engine, each of said cable ends of said first and second cable means being connectable to a portion of said first cowling section proximate said second boundary edge of said first cowling section, said means for extending and retracting said cables being operable to raise and lower said gas turbine engine between said mounting means of said engine installation and ground level.

20. The improved engine installation of claim 18 wherein said structural cowling further includes a first and second plurality of interlocks for securely latching said second cowling section to said first cowling section when said first and second cowling sections are to be joined together and for releasing said second cowling section from said first cowling section when said structural cowling is to be opened for access to said gas turbine engine, the individual interlocks of said first plurality of interlocks being spaced apart from one another and mounted along said first axially extending boundary edge of one of said first and second cowling sections, the individual interlocks of said second plurality of interlocks being spaced apart from one another and mounted along the second axially extending boundary edge of one of said first and second cowling sections, those one of said first and second axially extending boundary edges of said first and second cowling not including said interlocks having engagement means mounted thereon for engagement by an associated one of said interlocks.

21. The improved engine installation of claim 20 wherein said structural cowling further includes jackscrew drive means for operating all of said jackscrews of said first and second set of jackscrews in unison, said jackscrew drive means including first and second torque tubes, said first torque tube extending between each of said spaced-apart jackscrews of said first set of jackscrews, said second torque tube extending axially between each of said spaced-apart jackscrews of said second set of jackscrews, said first torque tube being interconnected with each jackscrew of said first set of jackscrews to operate said first set of jackscrews as the torque tube is rotated, said second torque tube being interconnected with each jackscrew of said second set of jackscrews to operate said second set of jackscrews as said second torque tube is rotated, said jackscrew drive means further including means for simultaneously rotating said first and second torque tubes.

22. A structural cowling for mounting a gas turbine engine of an aircraft propulsion system to an aircraft wherein said aircraft propulsion system includes an air inlet positioned forwardly of said gas turbine engine for delivering air to the front face of said gas turbine engine and wherein said aircraft propulsion system includes an exhaust system positioned rearwardly of said gas turbine engine for directing exhaust gasses supplied by said gas turbine engine to the atmosphere as a thrust producing fluid stream, said structural cowling being configured and arranged for supporting said gas turbine engine substantially independently of said air inlet and said exhaust system to substantially isolate said gas turbine engine from loading forces exerted by said air inlet and said exhaust system, said structural cowling comprising:
   first and second cowling units, each of said first and second cowling units having axially extending walls of arcuate cross-sectional geometry, said arcuate inner and outer walls of each of said first and second cowling units being concentrically spaced-apart from one another and joined together to define first and second boundary regions between the axially extending edges of said inner and outer walls, said first cowling unit being mountable to said aircraft, said first and second cowling units being configured and arranged for joining with one another with said first and second axial boundary regions of said first cowling unit respectively adjoining said first and second axially extending boundary regions of said second cowling unit to define an annular enclosure having a forward face and rear face substantially orthogonal to said axially extending inner and outer walls, said gas turbine engine being mountable within a central opening of said enclosure defined by said arcuate inner walls of said first and second cowling units, said forward face of said joined-together first and second cowling units including inlet mounting means for mounting and supporting said air inlet with said air inlet in fluid communication with said gas turbine engine, said inlet mounting means being configured for coupling substantially all mechanical load forces induced by said air inlet directly to said structural cowling without coupling an appreciable portion of said mechanical loading forces to said gas turbine engine, said rear face formed by said joined-together first and second cowling units including exhaust mounting means for mounting and supporting said exhaust system with said exhaust system in fluid communication with said gas turbine engine, said exhaust mounting means being configured for coupling substantially all mechanical load forces induced by said exhaust system directly to said structural cowling without coupling an appreciable portion of said mechanical loading forces to said gas turbine engine; and linking means for joining said second cowling unit to said first cowling unit, said linking means including means for securely attaching said second cowling unit to said first cowling unit when said first and second cowling units are joined together to enclose and support said gas turbine engine and including means for positioning said second cowling unit relative to said first cowling unit to provide access to said gas turbine engine.

23. The structural cowling of claim 22 wherein said means for positioning said second cowling unit relative to said first cowling unit for providing access to said gas turbine engine includes:

means for positioning said second cowling unit outwardly from said first cowling unit with said first boundary region of said first and second cowling units being interconnected with one another and spaced-apart in substantially parallel relationship with one another and with said second boundary regions of said first and second cowling units being interconnected with one another and spaced-apart in substantially parallel relationship with one another;

means for releasing said interconnection between said first boundary regions of said first and second cowling units to disconnect said first boundary regions of said first and second cowling units from one another; and means for swinging said second cowling unit about said second boundary region of said first cowling unit to provide access to said central opening for mounting said gas turbine engine.

24. The structural cowling of claim 23 wherein said means for positioning said second cowling unit outwardly of said first cowling unit comprises a first and second plurality of jackscrews, said first plurality of jackscrews extending in spaced-apart relationship with one another between said first boundary regions of said first and second cowling units, said second plurality of jackscrews extending in spaced-apart relationship with one another between said second boundary regions of said first and second cowling units, each jackscrew of said first plurality of jackscrews being attached to and linking said first boundary regions of said first and second cowling units, each jackscrew of said second plurality of jackscrews being attached to and linking said second boundary regions of said first and second cowling units, said means for releasing said structural interconnection of said first boundary regions of said first and second cowling units including means for disconnecting each jackscrew of said first plurality of jackscrews from said first boundary region of said second cowling unit, said means for swinging said second cowling unit about said second boundary region of said first cowling unit including hinge means integrally formed in each of said jackscrews of said second plurality of jackscrews.

25. The structural cowling of claim 24 wherein said means for securely attaching said second cowling unit to said first cowling unit includes a first and second plurality of interlocks, the individual interlocks of said first plurality of interlocks being spaced-apart from one another along the first boundary regions of said first and second cowling units, the individual interlocks of said second plurality of interlocks being spaced-apart from one another along the second boundary regions of said first and second cowling units, each interlock of said first and second plurality of interlocks including an engagement stud mounted to said first cowling unit and an associated engagement means mounted to said second cowling unit, each of said interlocks being operable to engage said studs with said associated engagement means to securely latch said first and second cowling units with one another and being operable to disengage said engagement means from said studs to unlatch said second cowling unit from said first cowling unit.

26. The structural cowling of claim 25 wherein each of said jackscrews of said first and second plurality of jackscrews includes a rod having a threaded first end portion and rotatably mounted nut means affixed to said first cowling unit, said nut means having an internally threaded central opening engaged with said threaded end region of said rod, said nut means being rotatable to move said threaded rod inwardly and outwardly to position said second cowling unit relative to said first cowling unit.

27. The structural cowling of claim 26 wherein the second end portion of each rod of said jackscrews of said first plurality of jackscrews includes an orthogonally extending stud having a substantially circular shaft region and an outwardly spaced, substantially circular head region of greater diameter than said shaft region, one of said studs projecting orthogonally from each of said rods of said first plurality of jackscrews with said circular head region being in a plane substantially orthogonal to said inner and outer axially extending arcuate walls, said second cowling unit further including a rotatable torque tube extending axially between said spaced-apart jackscrews of said first plurality of jackscrews, said torque tube being mounted within the interior region defined between said inner and outer arcuate walls of said second cowling unit, said torque tube including a plurality of substantially C-shaped keepers positioned for receiving an associated stud of one of said jackscrews of said first plurality of jackscrews, said C-shaped keepers having an annular groove therein configured and arranged for engagement with said head regions of said stud as said torque tube is rotated to a first position and configured and arranged for disengagement from said head regions as said torque tube is rotated to a second position; and wherein each of said rods of said second plurality of jackscrews includes first and second rod sections, said first rod section including said threaded end portion engaged with said rotatable nut means, one end of said second rod section being securely affixed to said second axially extending boundary region of said second cowling unit, said first and second rod sections being pivotably linked to one another to define said integral hinge means for swinging said second cowling unit about said second boundary region of said first cowling unit.

28. The structural cowling of claim 26 further comprising means for simultaneously rotating said nut means of said first and second plurality of jackscrews to position said second cowling unit relative to said first cowling unit.

29. The structural cowling of claim 28 wherein each of said nut means comprises a bevel gear having said internally threaded central opening threadedly engaged with said threaded end region of each of said jackscrew rods, and wherein said means for simultaneously rotating said nut means includes first and second rotatable torque tubes axially extending through the interior region defined between said arcuate inner and outer walls of said first cowling unit, said first torque tube extending between each jackscrew of said first plurality of jackscrews and including a bevel gear engaged with said bevel gear of each of said jackscrew nut means to rotate each of said nut means of said first plurality of jackscrews as said first torque tube is rotated, said second torque tube extending between each jackscrew of said second plurality of jackscrews and including a bevel gear engaged with said bevel gears of each of said jackscrew nut means of said second plurality of jackscrews to rotate each of said nut means of said second plurality of jackscrews as said second torque tube is rotated, said structural cowling further including means for simultaneously rotating said first and second torque tubes.

30. The structural cowling of claim 29 wherein said means for simultaneously rotating said first and second torque tubes includes:

first and second transfer gears mounted to the inner wall of said first cowling unit, each of said first and second transfer gears having an input shaft, said first and second transfer gears respectively engaged with and arranged to rotate said first and second torque tubes in response to rotation of said input shafts, each of said input shafts including axially extending opening;

a plurality of rods having universal couplings for serially connecting said rods with one another, said serially connected rods being supported along the interior surface of said inner wall of said second cowling unit with each of said rods being in a plane substantially orthogonal to said first and second boundary regions of said second cowling unit, said endmost ones of said serially connected rods being mounted and arranged for insertion in said openings of said input shafts of said transfer gears when said second cowling unit is positioned adjacent said first cowling unit said endmost ones of said serially connected rods passing from said openings of said input shafts when said interconnections between said first boundary region of said first and second cowling units are released and said second cowling unit is swung about said second boundary region of said first cowling unit; and, cranking means mounted to said second cowling unit and engaged with said plurality of serially connected rods, said cranking means including means for rotating said plurality of serially connected rods and said first and second torque tubes in response to rotation of a hand crank engageable with said cranking means.

31. The structural cowling of claim 25 further comprising actuator means operable for swinging said second cowling unit about said hinge means of each of said jackscrews of said second set of jackscrews.

32. The structural cowling of claim 31 wherein said actuator means include first and second cable means mounted within said first cowling unit, each of said first and second cable means having a cable extending therefrom with the end of said cables being connectable to a portion of said second cowling unit proximate to said first boundary edge of said second cowling unit, said first and second cable means including means for extending and retracting said cables of said first and second cable means to swing said second cowling unit between said position in which said first and second boundary edges of said first and second cowling units are spaced apart from one another in substantially parallel relationship and an equilibrium position which said second cowling unit assumes under the force of gravity, said actuator means further including third and fourth cable means mounted within said first cowling unit, each of said third and fourth cable means having a cable extending peripherally along said second cowling unit with the end of each cable of said third and fourth cable means being connected to said second cowling unit, said third and fourth cable means each further including means for extending and retracting said cables of said third and fourth cable means to swing said second cowling unit to positions beyond said equilibrium position.

33. The structural cowling of claim 32 wherein said first and second cable means are positionable to encircle the lower portion of said gas turbine engine for raising and lowering said gas turbine engine during procedures for installing and removing said gas turbine engine, each of said cable ends of said first and second cable means being connectable to a portion of said first cowling unit proximate said second boundary edge of said first cowling unit, said means for extending and retracting said cables being operable to raise and lower said gas turbine engine between said mounting means of said engine installation and ground level.

* * * * *